United States Patent
Rihei

(10) Patent No.: US 11,911,981 B2
(45) Date of Patent: Feb. 27, 2024

(54) COMPOSITE SHAPING APPARATUS AND COMPOSITE SHAPING METHOD

(71) Applicant: SUBARU CORPORATION, Tokyo (JP)

(72) Inventor: Atsushi Rihei, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 729 days.

(21) Appl. No.: 16/409,292

(22) Filed: May 10, 2019

(65) Prior Publication Data

US 2020/0290297 A1 Sep. 17, 2020

(30) Foreign Application Priority Data

Aug. 24, 2018 (JP) .................. 2018-156865

(51) Int. Cl.
*B29C 70/50* (2006.01)
*B29C 43/22* (2006.01)
*B29C 43/46* (2006.01)
*B29D 99/00* (2010.01)
*B29K 105/08* (2006.01)

(52) U.S. Cl.
CPC .......... *B29C 70/504* (2013.01); *B29C 43/224* (2013.01); *B29C 43/46* (2013.01); *B29D 99/0005* (2021.05); *B29C 2043/466* (2013.01); *B29C 2043/467* (2013.01); *B29K 2105/0872* (2013.01)

(58) Field of Classification Search
None
See application file for complete search history.

(56) References Cited

U.S. PATENT DOCUMENTS

| 2014/0272227 A1 | 9/2014 | Jeltsch et al. |
| 2016/0271890 A1 | 9/2016 | Rihei |
| 2017/0239897 A1 | 8/2017 | Rihei |

FOREIGN PATENT DOCUMENTS

| CN | 2765904 Y | * | 3/2006 |
| DE | 10 2012 017 595 A1 | | 3/2014 |
| EP | 2 633 965 A2 | | 9/2013 |
| JP | 04-299110 A | | 10/1992 |
| JP | 05-69450 A | | 3/1993 |
| JP | 07-080951 A | | 3/1995 |
| JP | 2014-172403 A | | 9/2014 |
| JP | 2016-175242 A | | 10/2016 |

(Continued)

OTHER PUBLICATIONS

Machine English Translation of EP2633965, Accessed Jan. 6, 2022 (Year: 2013).*

(Continued)

*Primary Examiner* — S. Behrooz Ghorishi
(74) *Attorney, Agent, or Firm* — Rimon P.C.

(57) ABSTRACT

A composite shaping apparatus includes at least one first roller that loads a prepreg with pressure, at least one second roller that loads the prepreg with pressure, and at least one motor that rotates at least one of the first roller or the second roller. The at least one first roller and the at least one second roller are rotated while at least one of rotation speed, roller diameter, or presence/absence of rotating power is made different between at least one of the first roller and at least one of the second roller.

6 Claims, 13 Drawing Sheets

(56) References Cited

FOREIGN PATENT DOCUMENTS

JP          2017-148985 A      8/2017

OTHER PUBLICATIONS

Machine English Translation of DE102012017595, Accessed Jan. 6, 2022 (Year: 2014).*
Machine English Translation of JPH04299110 Spec, Accessed Jan. 6, 2022 (Year: 1992).*
Machine English Translation of CN2765904, Accessed Jan. 6, 2022 (Year: 2006).*
Machine English Translation of JPH04299110 Abstract, Accessed Jan. 6, 2022 (Year: 1992).*
European Search Report issued in corresponding European Patent Application No. 19171764.4-1019, dated Dec. 9, 2019.
Japanese Notice of Reasons for Refusal issued in corresponding Japanese Patent Application No. 2018-156865, dated May 10, 2022, with English translation.

\* cited by examiner

COMPOSITE SHAPING APPARATUS AND COMPOSITE SHAPING METHOD

CROSS-REFERENCE TO RELATED APPLICATIONS

The present application claims priority from Japanese Patent Application No. 2018-156865 filed on Aug. 24, 2018, the entire contents of which are hereby incorporated by reference.

BACKGROUND

The disclosure relates to a composite shaping apparatus and a composite shaping method.

Composites, such as glass fiber reinforced plastics (GFRPs) and carbon fiber reinforced plastics (CFRPs), are formed by stacking sheet-shaped prepregs and thermally curing the stack of the prepregs. Some aircraft component parts, such as stringers, spars, and ribs, have T or I-shaped cross sections. To form such component parts, a stack of prepregs stacked in a planar shape, a stack of prepregs stacked so as to have an L or C-shaped cross section, and a stack of prepregs stacked so as to have a cross section whose shape is axially symmetrical to the L or C shape are combined before curing.

The corner of a stack of prepregs bent at right angle has a rounded shape. Therefore, when two squarely bent prepreg stacks are disposed symmetrically to each other so as to face and touch each other on a planar prepreg stack, a space having a substantially triangular cross section is formed between the prepreg stacks. More concretely, the three prepreg stacks define a space therebetween whose cross-sectional shape is determined by a straight line and two symmetrical arcs that correspond to the two rounded corners.

Therefore, the space formed between the three prepreg stacks is filled with a filler (filling material). Usually, a filler is prepared also as a prepreg stack and is thermally cured together with the other prepreg stacks. A bar-shaped filler whose cross-sectional shape is formed by two symmetrical arcs and a straight line is called a noodle filler. A noodle filler is manufactured by forming a round bar-shaped material obtained by stacking a prepreg into a coil shape.

Incidentally, the forming performed on a prepreg stack prior to thermal curing is generally called shaping in order to distinguish it from the forming of a composite by thermal curing. Therefore, the forming performed on a stack of prepregs will hereinafter be referred to as shaping.

With regard to related-art shaping methods for a prepreg stack, it is a general practice to use a molding die for shaping (a shaping die). For instance, a method in which a prepreg stack is set in a shaping die and shaped under a vacuum pressure, a method in which a prepreg stack is shaped by an extruder whose mouthpiece (die) is a shaping die whose shape corresponds to that of the stack obtained after the extrusion-shaping, a method in which a prepreg stack is shaped by pressing rollers against the prepreg stack, etc. are known.

However, the shaping methods that use vacuum pressure have a problem of long shaping times. Concretely, a typical prepreg stack shaping method that uses vacuum pressure requires several hours to about one day for the shaping. Furthermore, in the case where a bar-shaped filler, such as a noodle filler, is shaped, it is necessary to prepare a shaping die that is capable of shaping the whole filler. In the case where an extruder is used to shape a prepreg stack, the resistance in shaping is so large that a hefty apparatus is needed in order to pull out the stack.

As a shaping apparatus for a noodle filler, apparatuses that press a bar-shaped material with two rollers set in parallel have been proposed (see, e.g., Japanese Unexamined Patent Application Publication 4-299110). Such an apparatus can shape a noodle filler by clamping a bar-shaped material between a cylindrical roller and a roller that has a recess that corresponds in shape to the noodle filler and driving the bar-shaped material out from the gap between the two rollers.

Apparatuses that press a bar-shaped material by three rollers have also been proposed (see, e.g., Japanese Unexamined Patent Application Publication Nos. 2016-175242 and 2017-148985). Such a filler shaping apparatus having three rollers can shape a filler with sufficiently high quality because the apparatus can more uniformly press the filler from three directions.

SUMMARY

An aspect of the disclosure provides a composite shaping apparatus including at least one first roller configured to load a prepreg with pressure, at least one second roller configured to load the prepreg with pressure, and at least one motor that rotates at least one of the at least one first roller or the at least one second roller. The at least one first roller and the at least one second roller are rotated while at least one of rotation speed, roller diameter, or presence/absence of rotating power is made different between the at least one first roller and the at least one second roller.

An aspect of the disclosure provides a composite shaping method. The method includes loading the prepreg with pressure with the above composite shaping apparatus so that the shaped prepreg is manufactured using the above composite shaping apparatus An aspect of the disclosure provides a composite shaping method includes manufacturing a shaped prepreg by rotating at least one of at least one first roller or at least one second roller by a motor and loading the prepreg with pressure by the at least one first roller and the at least one second roller while feeding the prepreg by the at least one first roller and the at least one second roller, and reducing wrinkle that is possibly formable on the prepreg, by rotating the at least one first roller and the at least one second roller, with at least one of rotation speed, roller diameter, or presence/absence of rotating power being made different between the at least one first roller and the at least one second roller in.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
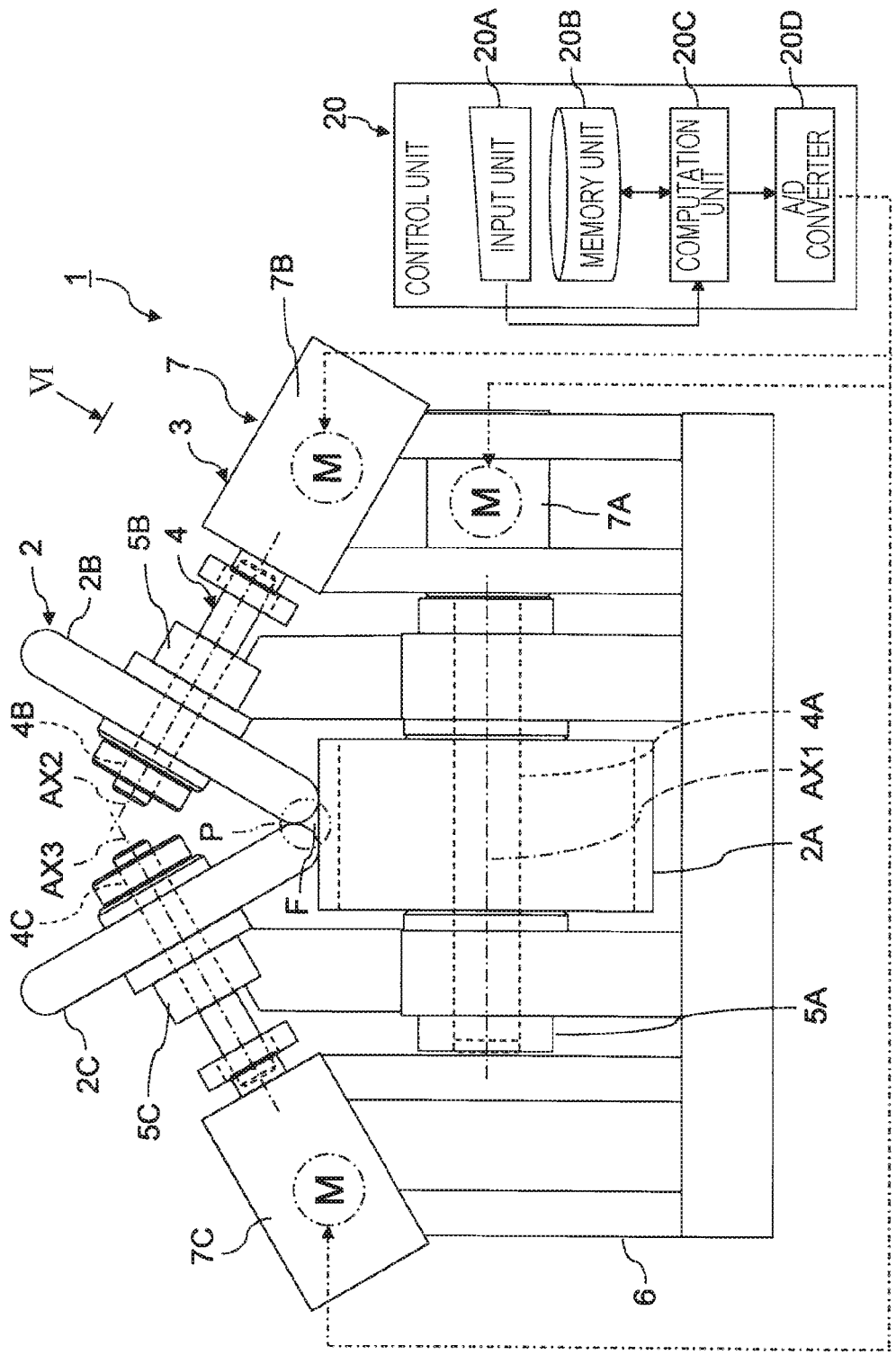
FIG. 1 is a configuration diagram of a composite shaping apparatus according to a first embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. The shaping of a filler by rollers allows the shaping apparatus to be considerably reduced in size, in comparison with the shaping of a filler by an extruder, but has a problem that the surface of the filler and a roller sometimes deviate from each other so that wrinkles are formed on the surface of the filler.

For the forming of a hollow composite, forming methods for a composite hollow body which prevents formation of wrinkles by disposing a plurality of rolls and wrapping prepreg sheets over and over while heating and pressurizing the prepreg sheets have been proposed (see, e.g., Japanese Unexamined Patent Application Publication 7-80951).

However, a technique for preventing formation of a wrinkle on a filler during the shaping of the filler prior to thermal curing has not been devised.

It is desirable to make it possible to shape a composite prior to the thermal curing of a filler or the like, without allowing a wrinkle to be formed.

First Embodiment (Configuration and Functions)

FIG. 1 is a configuration diagram of a composite shaping apparatus according to a first embodiment of the disclosure.

A composite shaping apparatus 1 is an apparatus for shaping a stack of prepregs P by using a plurality of rollers 2. A prepreg P is a sheet-shaped bundle of fibers impregnated with an uncured thermosetting resin. In other words, a prepreg P is a sheet of a thermosetting resin reinforced with a sheet-shaped bundle of fibers. A shaped stack of prepregs P can be formed into a composite by heating the stack in an oven or an autoclave apparatus. Therefore, a stack of prepregs P that has been shaped can be considered a composite that has yet to be thermally cured.

FIG. 1 illustrates an example of the composite shaping apparatus 1 in which a filler F is shaped by using three rollers 2A, 2B, and 2C. The filler F is a component part for filling a space that is formed between other composite component parts.

Figure 2:
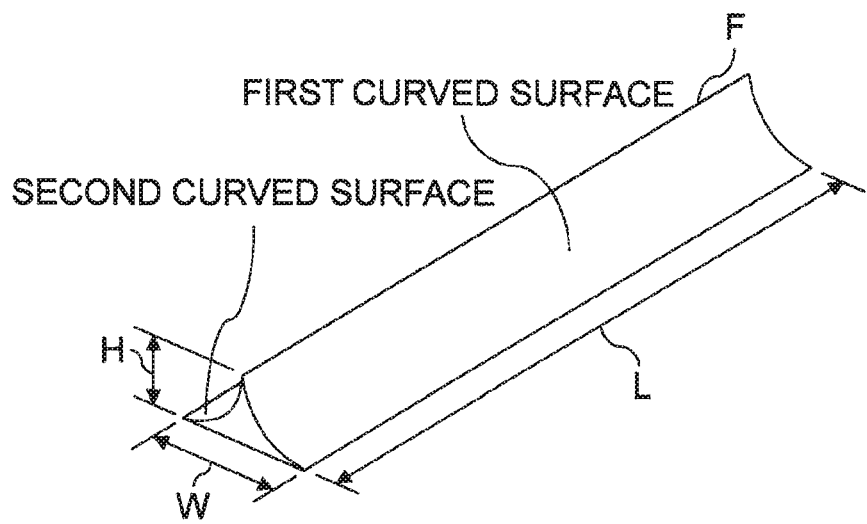
FIG. 2 is a perspective view illustrating an example of a structure of a filler.

FIG. 2 is a perspective view illustrating an example of a structure of a filler F.

A typical filler F has a bar-shaped structure whose cross-sectional shape is determined by two symmetrical arcs and a straight line as illustrated as an example in FIG. 2. Concretely, the filler F has a shape that is determined by a rectangular flat surface whose width is W and whose length is L, a first curved surface whose cross section is an arc, and a second curved surface symmetrical to the first curved surface. Therefore, the height H of the filler F is the distance between the rectangular flat surface and a line of intersection of the first curved surface and the second curved surface.

The filler F that has a structure as illustrated in FIG. 2 is used mainly to fill a space that is formed when two prepreg stacks each bent at right angle so as to form a round corner are placed symmetrically, facing and touching each other, and placed on a flat or slightly curved platy stack of prepregs.

Figure 3:
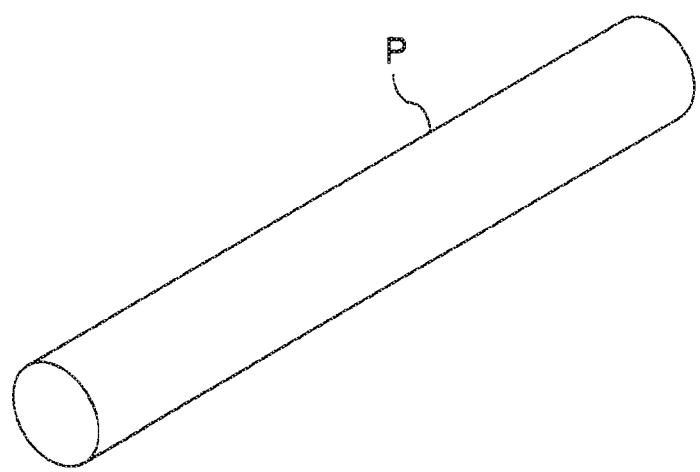
FIG. 3 is a perspective view illustrating an example of a structure of a stack of prepregs that is to be a material of a filler.

FIG. 3 is a perspective view illustrating an example of a structure of a stack of prepregs P that can be used as a material of a filler.

In the case where, using the composite shaping apparatus 1, the filler F that has a structure as illustrated as an example in FIG. 2 is subjected to shaping prior to thermal curing, the filler F can be manufactured by using as a material a bar-shaped stack of prepregs P as illustrated in FIG. 3. The bar-shaped stack of prepregs P can be manufactured, for instance, by rolling one sheet-shaped prepreg P into a coil shape. Therefore, ideally, the material of the filler F is a round bar-shaped stack of prepreg P whose cross-sectional shape is substantially circular as illustrated in FIG. 3; however, in reality, it is often the case that the cross-sectional shape of the stack of prepreg P is not accurately circular, because uncured resin easily deforms.

When a filler F having a structure as illustrated as an example in FIG. 2 is shaped by the composite shaping apparatus 1, the shaping of the filler F by the composite shaping apparatus 1 is a forming process in which the filler F is processed to obtain a flat surface whose width is W and whose length is L, a first curved surface whose cross section is an arc, and a second curved surface symmetrical to the first curved surface.

Figure 4:
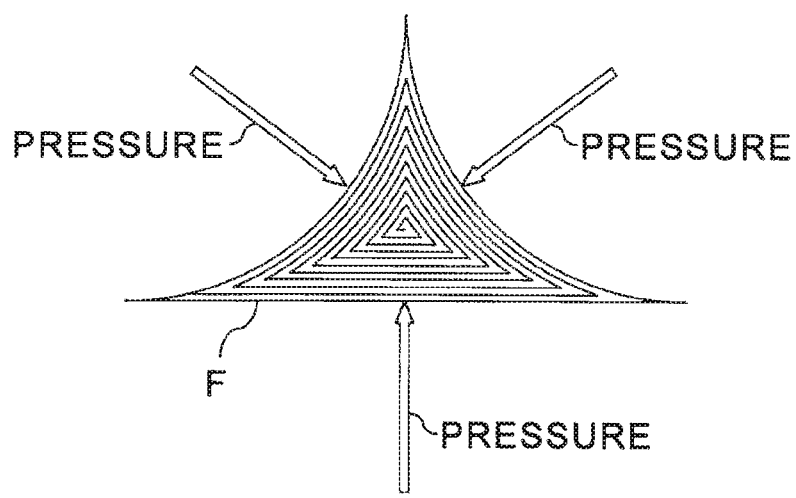
FIG. 4 is a schematic diagram illustrating a structure of a cross section of a filler that has been shaped by a composite shaping apparatus pressurizing a stack of prepregs from three directions.

FIG. 4 is a schematic diagram illustrating a structure of a cross section of the filler F shaped by the composite shaping apparatus 1 pressurizing the stack of prepregs P from three directions.

Three rollers 2A, 2B, and 2C are disposed at such positions as to clamp the bar-shaped stack of prepreg P rolled in a coil shape and the three rollers 2A, 2B, and 2C are caused to apply pressure to the bar-shaped stack of prepregs P so as to carry out the shaping of the filler F. As a result, the cross section of the filler F obtains a coil structure as illustrated in FIG. 4. Therefore, the stacking directions of the prepreg P are perpendicular to the length of the filler F.

In order to shape a filler F that has a structure as illustrated as an example in FIG. 4, the composite shaping apparatus 1 can be constructed of three rollers 2A, 2B, and 2C that apply pressures at mutually different angles to a stack of prepreg P stacked in a bar shape and a rotation mechanism 3 that rotates the three rollers 2A, 2B, and 2C. Each of the three rollers 2A, 2B, and 2C is a roller for shaping one of the flat surface and the two curved surface of the filler F. Therefore, the three rollers 2A, 2B, and 2C rotate about three axes AX1, AX2, and AX3 that are not parallel to one another. Specifically, the first, second, and third rollers 2A, 2B, and 2C are disposed so that a space that corresponds to the cross-sectional shape of the filler F determined by two axially symmetrical arcs and one straight line is formed between the first, second, and third rollers 2A, 2B, and 2C.

More concretely, the first roller 2A rotates about the first axis AX1. The second roller 2B rotates about the second axis AX2 that is inclined with respect to the first axis AX1. The third roller 2C rotates about the third axis AX3 that is inclined with respect to the first axis AX1 and that is symmetrical to the second axis AX2 with respect to a plane perpendicular to the first axis AX1.

The first roller 2A is a roller for shaping the flat surface whose width is W and whose length is L. Therefore, the first roller 2A may be a cylindrical or hollow cylindrical roller that rotates about the first axis AX1 extending in a horizontal direction. The second roller 2B is a roller for shaping one of the curved surfaces of the filler F that correspond to round corners. Therefore, the second roller 2B may be a circular disc-shaped roller having a circumferential portion whose cross section has a radius substantially equal to the radius of the curved surfaces of the filler F that correspond to the round corners. The third roller 2C is a roller for shaping the other one of the curved surfaces of the filler F that correspond to the round corners. Therefore, the third roller 2C, similar to the second roller 2B, may be a circular disc-shaped roller having a circumferential portion whose cross section has a radius substantially equal to the radius of the curved surfaces of the filler F that correspond to the round corners.

However, since the curved surfaces of the filler F that correspond to the round corners are symmetrical to each other with respect to a plane, the second axis AX2 of the second roller 2B and the third axis AX3 of the third roller 2C are symmetrical to each other with respect to a plane perpendicular to the first axis AX1. It is important that the inclination angles of the second axis AX2 and the third axis AX3 to the first axis AX1 be set to angles that are suitable for the shaping of the filler F. The angles of the second axis AX2 and the third axis AX3 that are suitable for the shaping of the filler F can be set from various viewpoints.

Figure 5:
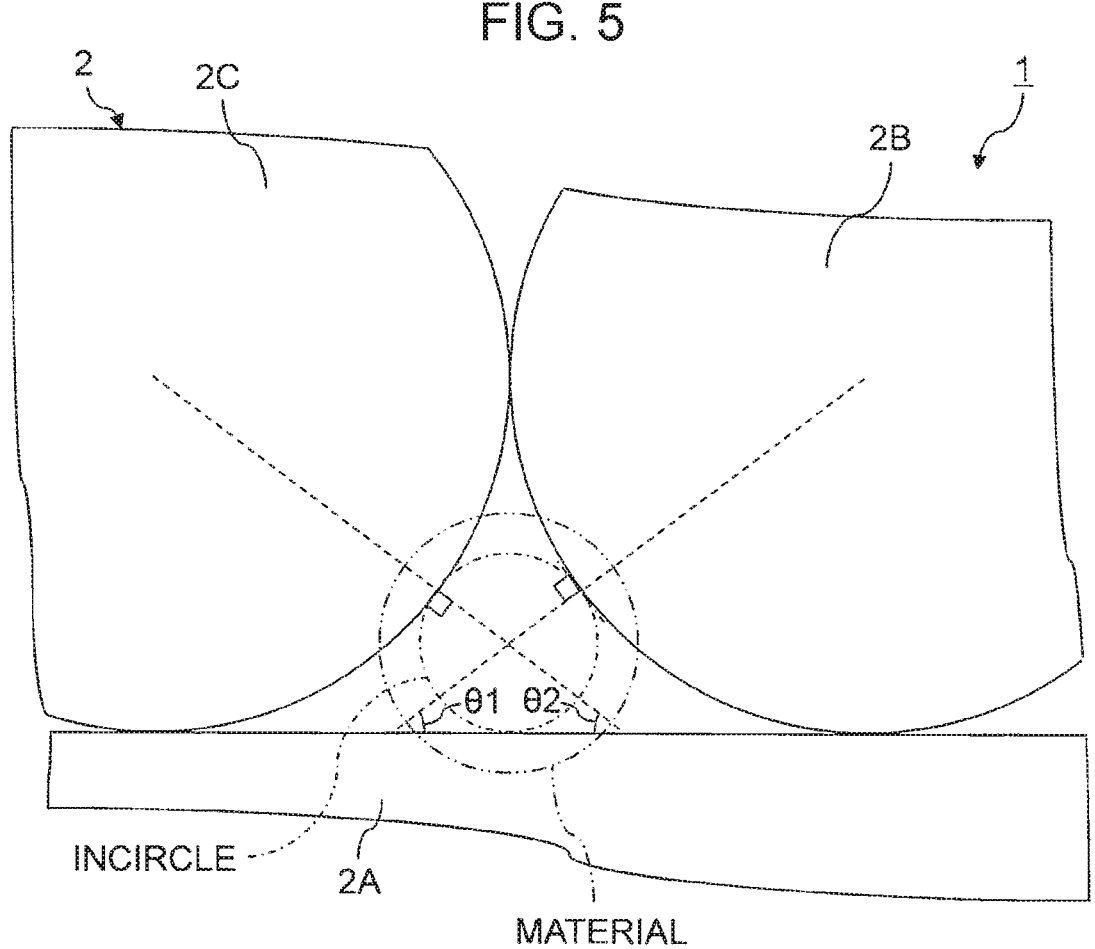
FIG. 5 is a diagram illustrating a method for determining inclination angles of a second axis and a third axis with respect to a first axis indicated in FIG. 1.

FIG. 5 is a diagram illustrating a method for setting the inclination angles of the second axis AX2 and the third axis AX3 with respect to the first axis AX1 illustrated in FIG. 1.

Shaping tests were conducted with varied angles of the second axis AX2 and the third axis AX3. Test results confirmed that disposing the first, second, and third rollers 2A, 2B, and 2C so that the inclination angles of the second axis AX2 and the third axis AX3 to the first axis AX1 are greater than or equal to 45 degrees and less than or equal to 60 degrees, in other words, setting the angles θ1 and θ2 of the directions of pressing the second roller 2B and the third roller 2C with respect to the surface of the first roller 2A to angles greater than or equal to 30 degrees and less than or equal to 45 degrees, is suitable from the viewpoint that compression force should be uniformly applied to the three surfaces of the material.

Particularly, it was confirmed that setting the inclination angle of the second axis AX2 and the third axis AX3 with respect to the first axis AX1 to angles within a predetermined tolerance from ±53.13 degrees, that is, setting the angles θ1 and θ2 of the direction of pressing the second roller 2B and the third roller 2C with respect to the surface of the first roller 2A to ±36.87 degrees, substantially equalizes the maximum distances by which the three surfaces of a round bar-shaped material are compressed as illustrated in FIG. 5 and therefore is suitable.

It was also confirmed that, from the viewpoint of improving the flatness of the lower surface of the filler F, it is suitable that the first, second, and third rollers 2A, 2B, and 2C be disposed so that the inclination angles of the second axis AX2 and the third axis AX3 with respect to the first axis AX1 are greater than or equal to 10 degrees and less than or equal to 40 degrees. That is, in order to improve the flatness of the lower surface of the filler F, it is suitable that the angles θ1 and θ2 at which the second roller 2B and the third roller 2C are pressed be greater than or equal to 50 degrees and less than or equal to 90 degrees.

Therefore, the preferable range of the inclination angles of the second axis AX2 and the third axis AX3 to the first axis AX1 change depending on which of the uniformity of internal layers of the filler F and the flatness of the lower surface of the filler F is considered more important.

The concrete shapes and sizes of the first, second, and third rollers 2A, 2B, and 2C can be determined according to the size of the filler F. For instance, it suffices that radii of the second roller 2B and the third roller 2C measured at their end portions are equal to the radii measured at the corresponding round surfaced portions of the filler F. The length of the first roller 2A is set to a length that at least covers the lower surface of the filler F.

The diameters of the first, second, and third rollers 2A, 2B, and 2C can be set to arbitrary lengths. However, as the diameters of the first, second, and third rollers 2A, 2B, and 2C are larger, the feed of the material per rotation of each of the rollers 2A, 2B, and 2C can be made correspondingly larger, and therefore the material feed speed can be made greater.

It is desirable that the first, second, and third rollers 2A, 2B, and 2C have mold releasability with respect to a stack of prepreg P which is a material of the filler F. In fact, the mold releasability was checked using as materials aluminum having a ceramic coating for providing durability and non-stickiness for the prepreg P, aluminum coated with a fluorine resin such as polytetrafluoroethylene (PTFE) or tetrafluoro-ethylene-hexafluoropropylene copolymer (FEP), polyurethane, polytetrafluoroethylene (PTFE), and nylon 6,6 (a polyamide whose molecule structure is represented by $\{CO-(CH_2)_4-CO-NH-(CH_2)_6-NH\}_n$). The results confirmed that the aluminum having a ceramic coating for giving non-stickiness and durability are good in both durability and mold releasability.

Therefore, from the viewpoint of securing durability and mold releasability with respect to the prepreg P, ceramic-coated metals are preferable as materials of the rollers 2A, 2B, and 2C. Hence, it is desirable that at least one of the three rollers 2A, 2B, and 2C be formed from a metal coated with a ceramic that has non-stickiness and durability.

A rotation mechanism 3 is an apparatus for rotating the first, second, and third rollers 2A, 2B, and 2C. Therefore, in the rotation mechanism 3, a first bearing 5A for holding a first rotation shaft 4A of the first roller 2A, a second bearing 5B for holding a second rotation shaft 4B of the second roller 2B, and a third bearing 5C for holding a third rotation shaft 4C of the third roller 2C can be provided on a stand 6.

The first bearing 5A has such a structure that the first rotation shaft 4A protruding from both sides of the cylindrical or hollow cylindrical first roller 2A are held at two side, that is, both sides of the first roller 2A. The second bearing 5B and the third bearing 5C have such structures as to hold a second rotation shaft 4B of the circular disc-shaped second roller 2B and a third rotation shaft 4C of the circular disc-shaped third roller 2C at predetermined inclination angles.

It is desirable that the first bearing 5A, the second bearing 5B, and the third bearing 5C be sealed type angular ball bearings. That is, it is desirable that the three rollers 2A, 2B, and 2C be constructed so as to be rotated in sealed type angular ball bearings. The angular ball bearings are bearings capable of withstanding loads in the radial directions and axial directions. Therefore, if angular ball bearings are used, loads applied diagonally from the rollers 2A, 2B, and 2C can be withstood. Furthermore, employment of sealed type angular ball bearings prevents leakage of lubricating oil.

Because of being able to avoid the use of a lubricating oil, oilless bushes were used as bearings to perform shaping tests. It was revealed that the bearings become fixed due to the loads from the rollers 2A, 2B, and 2C. It was also revealed that a radial ball bearing that receives loads in radial directions, when used, cannot sufficiently bear loads that are obliquely applied. Therefore, sealed type angular bearings capable of preventing leakage of a lubricating oil and withstanding obliquely applied loads are suitable as the first bearing 5A, second bearing 5B, and the third bearing 5C.

The rotation mechanism 3 further includes motors 7A, 7B, and 7C for producing rotating power for rotation shafts 4A, 4B, and 4C of the first, second, and third rollers 2A, 2B, and 2C. Therefore, the first, second, and third rollers 2A, 2B, and 2C rotate automatically, independently of an operator's manual operation, so that a round bar-shaped stack of prepreg P as a material is fed out by friction forces occurring between the prepreg P and the first, second, and third rollers 2A, 2B, and 2C.

Output shafts of the motors 7A, 7B, and 7C may be provided so as to be coaxial with the rotation shafts 4A, 4B, and 4C of the first, second, and third rollers 2A, 2B, and 2C or may also be provided so as not to be coaxial with the rotation shafts 4A, 4B, and 4C. In the case where the output shafts of the motors 7A, 7B, and 7C are provided so as to be coaxial with the rotation shafts 4 of the rollers 2, a power transmission mechanism for transmitting rotating powers output from the output shafts of the motors 7 to the rotation shafts 4 of the rollers 2 is provided.

In the example illustrated in FIG. 1, the output shaft of the first motor 7A is directly coupled to the rotation shaft 4A of the cylindrical or hollow cylindrical first roller 2A. Specifically, the rotation shaft 4A of the first roller 2A and the output shaft of the first motor 7A are disposed so as to align on a straight line. Therefore, motive power can be transmitted directly from the output shaft of the first motor 7A to the rotation shaft 4A of the first roller 2A so as to automatically rotate the first roller 2A.

On the other hand, the second motor 7B for producing rotating power for the rotation shaft 4B of the circular disc-shaped second roller 2B and the third motor 7C for producing rotating power for the rotation shaft 4C of the circular disc-shaped third roller 2C are disposed at such positions that the output shafts of the motors 7B and 7C are parallel to but not collinear with the rotation shafts 4B and 4C, respectively.

Figure 6:
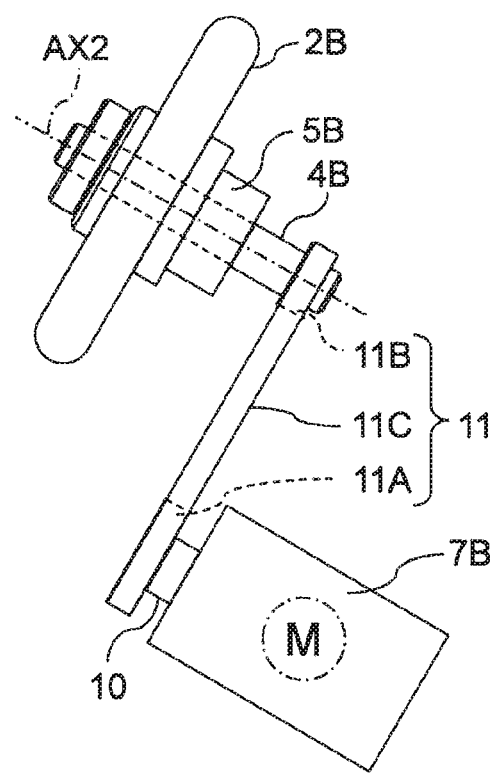
FIG. 6 is a view of a second roller, a second motor, and a power transmission mechanism for transmitting motive power from the second motor to the second roller illustrated in FIG. 1 which is viewed from a direction A indicated in FIG. 1.

FIG. 6 is a view of the second roller 2B, the second motor 7B, and a power transmission mechanism for transmitting motive power from the second motor 7B to the second roller 2B illustrated in FIG. 1 which has been taken from a direction A.

As illustrated in FIG. 6, in the case where the output shaft 10 of the second motor 7B and the rotation shaft 4B of the second roller 2B are not on the same straight line, a power transmission mechanism 11 for transmitting rotating power from the second motor 7B to the rotation shaft 4B of the second roller 2B can be constructed of pulleys 11A and 11B and a power transmission belt 11C.

Concretely, the first pulley 11A may be provided on the output shaft 10 of the second motor 7B and the second pulley 11B may be provided on the rotation shaft 4B of the second roller 2B. Then, the first pulley 11A provided on the output shaft 10 of the second motor 7B and the second pulley 11B provided on the rotation shaft 4B of the second roller 2B are connected by the power transmission belt 11C so that rotating power can be transmitted from the second motor 7B to the rotation shaft 4B of the second roller 2B.

Of course, the power transmission mechanism 11 does not necessarily need to be constructed of the pulleys 11A and 11B and the power transmission belt 11C but can instead be constructed of other desired components such as a gear train or sprockets engaged with a chain. A power transmission mechanism for transmitting rotating power from the third motor 7C to the rotation shaft 4C of the third roller 2C can also be constructed similarly to the power transmission mechanism 11 for transmitting rotating power from the second motor 7B to the rotation shaft 4B of the second roller 2B.

The rotation shafts 4A, 4B, and 4C of the first, second, and third rollers 2A, 2B, and 2C receive rotating power from the first, second, and third motors 7A, 7B, and 7C, respectively. Therefore, the first, second, and third rollers 2A, 2B, and 2C are rotated by the rotating power from the first, second, and third motors 7A, 7B, and 7C.

However, the first, second, and third motors 7A, 7B, and 7C are controlled so that the rotation speed (number of rotations per unit time) of the first roller 2A for shaping the flat surface of the filler F and the rotation speed of the second and third rollers 2B and 2C for shaping the curved surfaces of the filler F are different from each other. That is, a rotation speed different is intentionally provided between the first roller 2A and the second and third rollers 2B and 2C. In this case, the first motor 7A is controlled so as to rotate the rotation shaft 4A of the first roller 2A at a first rotation speed while each of the second and third motors 7B and 7C is controlled so that each of the rotation shafts 4B and 4C of the second and third rollers 2B and 2C is rotated at a second rotation speed that is different from the first rotation speed.

Therefore, as illustrated as an example in FIG. 1, a control unit 20 for overall control of the first, second, and third motors 7A, 7B, and 7C may be provided according to need.

The control unit 20 controls the rotation speeds of the first, second, and third motors 7A, 7B, and 7C by outputting, to the first, second, and third motors 7A, 7B, and 7C, control values of the rotation speeds of their output shafts. The control unit 20 can be constructed of circuits, including an electronic circuit such as a computer that includes an input unit 20A, memory unit 20B, and a computation unit 20C, an analog-to-digital (A/D) converter 20D, etc.

Of course, instead of the control unit 20, an operating person may adjust the outputs of the first, second, and third motors 7A, 7B, and 7C. Since the rotation speeds of the output shafts of the first, second, and third motors 7A, 7B, and 7C are adjusted by an operating person or the control unit 20, the first, second, and third motors 7A, 7B, and 7C are variable-output motors.

Next, a method for determining the first rotation speed of the first roller 2A and the second rotation speed of the second and third rollers 2B and 2C will be described.

Figure 7:
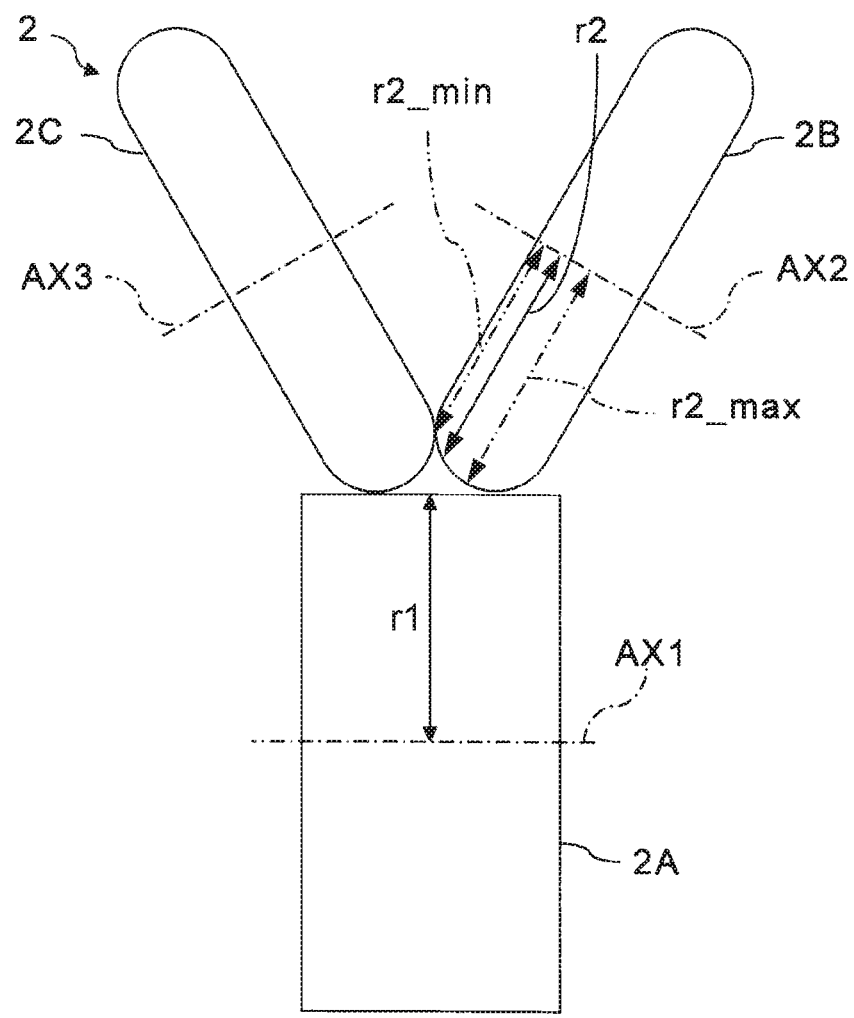
FIG. 7 is a diagram illustrating advantageous effects obtained by causing a rotation speed difference among the first, second, and third rollers illustrated in FIG. 1.
Figure 8:
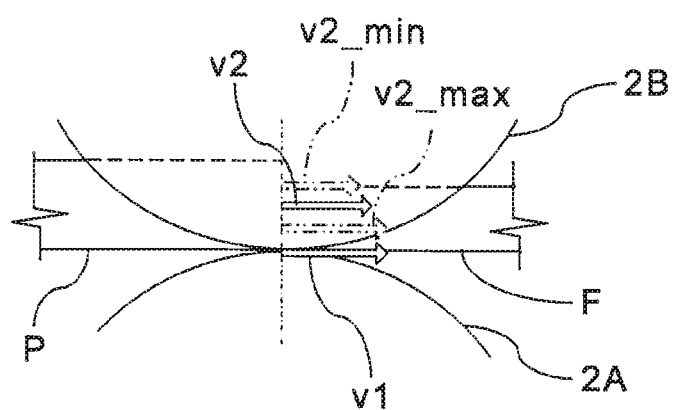
FIG. 8 is a right side view of the first and second rollers illustrated in FIG. 7.

FIG. 7 illustrates advantageous effects that are achieved by providing a rotation speed difference among the first, second, and third rollers 2A, 2B, and 2C illustrated in FIG. 1. FIG. 8 is a right side view of the first and second rollers 2A and 2B illustrated in FIG. 7.

As illustrated in FIG. 7, the first roller 2A for shaping the flat surface of the filler F has a simple hollow cylindrical structure or a simple cylindrical structure. Therefore, the first roller 2A has a uniform radius r1. Therefore, as indicated in FIG. 8, when the first roller 2A is rotated at a constant angular velocity to shape the flat surface of the filler F, the speed v1 of an outer surface of the first roller 2A is constant at any position in the direction of the first axis AX1. That is, the first roller 2A is in contact with the stack of prepreg P and the filler F at the constant speed v1.

On the other hand, the second and third rollers 2B and 2C for shaping the round surfaces of the filler F have a circular disc-shaped structure whose outer periphery has a curved surface that corresponds to the round surfaces of the filler F. Concretely, as indicated in FIG. 7, a vertical sectional shape of the second and third rollers 2B and 2C has an arc that corresponds to the round surfaces of the filler F.

Therefore, the radius r2 of the second roller 2B changes depending on position in the direction of the second axis AX2. Hence, as indicated in FIG. 8 the speed v2 of the outer surface of the second roller 2B is constant. Concretely, since the speed v2 of the outer surface of the second roller 2B is proportional to the radius r2 of the second roller 2B, the speed v2 of the outer surface has a maximum value v2_max at the position at which the radius r2 of the second roller 2B has a maximum value r2_max and the speed v2 of the outer surface has a minimum value v2_min at the position at which the radius r2 of the second roller 2B has a minimum value r2_min. Therefore, the second roller 2B contacts the filler F, with the speed v2 varying over a distribution range. This applies to the third roller 2C as well.

Because of the facts, for instance, that the speeds of the surfaces of the first, second, and third rollers 2A, 2B, and 2C which are in contact with the filler F are not constant, and that the amounts of deformation of the stack of prepreg P caused by the first roller 2A and the second and third rollers 2B and 2C are different from each other, and also that the amount of sliding between the first roller 2A and the stack of prepreg P is different from the amount of sliding between the second and third rollers 2B and 2C and the stack of prepreg P, shaped fillers F sometimes have wrinkles formed thereon.

In fact, the shaping of a filler F performed by rotating the first, second, and third rollers 2A, 2B, and 2C at the same rotation speed in conditions that the radius r1 of the first roller 2A was equal to the maximum value r2_max of the radii r2 of the second and third rollers 2B and 2C confirmed that it is sometimes the case that wrinkles are formed on the entire filler F and, furthermore, a filler F temporarily warps upward and then droops by its own weight after passing the first, second, and third rollers 2A, 2B, and 2C.

A cause for the upward warpage of the filler F is considered to be that the speed v2 of the second and third rollers 2B and 2C in contact with the filler F reaches a minimum value v2_min at a summit of the filler F formed as a boundary between the two curved surfaces. Wrinkles can be considered to be formed as prepregs P near the surfaces are dragged rearward by portions of the second and third rollers 2B and 2C which are in contact with the filler F and low in the speed v2.

However, the distribution of the amount of slip of surface prepreg P is not proportional to the distribution of the radius r2 of the second and third rollers 2B and 2C and the distribution of the speed v2. Therefore, it is speculated that causes for wrinkles also include the resistance to slip between layers of prepregs P and non-uniform slide of the filler F with respect to the first, second, and third rollers 2A, 2B, and 2C.

With regard to this issue, it is possible to set a difference between the first rotation speed of the first roller 2A and the second rotation speed of the second and third rollers 2B and 2C so as to reduce the factors that cause wrinkles and deformation, such as the factor that the speed v2 of the second and third rollers 2B and 2C in contact with the filler F is not constant, the factor that sliding occurs between the filler F and the first, second, and third rollers 2A, 2B, and 2C, the factor that the amount of deformation caused on the stack of prepreg P differs between the first roller 2A and the second and third rollers 2B and 2C, etc.

An appropriate rotation speed difference between the first rotation speed of the first roller 2A and the second rotation speed of the second and third rollers 2B and 2C can be determined by a shaping test on a filler F. In order to inhibit formation of wrinkles, it is important that an average speed v2 of portions of the second and third rollers 2B and 2C which are in contact with the filler F be kept not excessively high or not excessively low in comparison with the speed v1 of the outer surface of the first roller 2A which is in contact with the filler F. Therefore, in the case where the radius r1 of the first roller 2A is equal to the maximum value r2_max of the radius r2 of each of the second and third rollers 2B and 2C, the second rotation speed of the second and third rollers 2B and 2C is set to a greater value than the first rotation speed of the first roller 2A unless there is a special condition.

The distribution of the speed v2 on the outer periphery of the second and third rollers 2B and 2C changes with the angle between the first axis AX1 of the first roller 2A and each of the second and third axes AX2 and AX3 of the second and third rollers 2B and 2C. Furthermore, the amounts of sliding between the first, second, and third rollers 2A, 2B, and 2C and the post and pre-shaping stacks of prepregs P is considered to change with shaping conditions such as the material of prepregs P, the temperature at which the stack of prepreg P is loaded with pressures, and the humidity at which the stack of prepreg P is loaded with pressures.

A filler F having a different thickness can be shaped if the second and third rollers 2B and 2C are replaced with rollers that differ from the second and third rollers 2B and 2C in the radii thereof measured at end portions of vertical sections thereof, the end portions serving to shape the curved surfaces of a filler F that correspond to round corners. In this case, the distribution of the speed v2 on the outer periphery of the second and third rollers 2B and 2C changes also with the radius of each of the second and third rollers 2B and 2C measured at the end portion of a vertical section thereof.

Therefore, conditions for making the rotation speeds of the first roller 2A and the second and third rollers 2B and 2C different from each other can be determined beforehand separately for shaping conditions by tests. For instance, tests are performed by varying shaping conditions, such as the materials of prepregs P, the temperature at which the stack of prepreg P is loaded with pressures, the humidity at which the stack of prepreg P is loaded with pressures, the angle between the first axis AX1 of the first roller 2A and each of the second and third axes AX2 and AX3 of the second and third rollers 2B and 2C, and the radii of each of the circular disc-shaped second and third rollers 2B and 2C measured at the end portion of a vertical section thereof, so that appropriate rotation speed differences between the first rotation speed of the first roller 2A and the second rotation speed of the second and third rollers 2B and 2C can be obtained separately for each of the shaping conditions.

This makes it possible to determine appropriate rotation speed differences between the first rotation speed of the first roller 2A and the second rotation speed of the second and third rollers 2B and 2C in relation to actual shaping conditions. As a concrete example, an appropriate rotation speed difference between the first rotation speed and the second rotation speed can be determined in relation to at least one of the material of prepregs P, the temperature at which the stack of prepreg P is loaded with pressures, the humidity at which the stack of prepreg P is loaded with pressures, the angle between the first axis AX1 of the first roller 2A and each of the second and third axes AX2 and AX3 of the second and third rollers 2B and 2C, or the radii of each of the circular disc-shaped second and third rollers 2B and 2C measured at the end portion of a vertical section of each roller.

Appropriate rotation speed differences between the first rotation speed and the second rotation speed for each of the shaping conditions can be saved in the memory unit 20B. As a practical example, a table that indicates relations between shaping conditions and appropriate rotation speed differences between the first rotation speed and the second rotation speed may be saved in the memory unit 20B.

Then, if information for specifically determining shaping conditions is input to the computation unit 20C from the input unit 20A, the computation unit 20C can obtain an appropriate preset rotation speed difference between the first rotation speed and the second rotation speed by referring to the memory unit 20B. Then, the control unit 20 can set, in the computation unit 20C, control values of the rotation speeds of the first, second, and third motors 7A, 7B, and 7C so that the first roller 2A and the second and third rollers 2B and 2C will rotate with the rotation speed difference obtained with reference to the memory unit 20B, and then can output, from the computation unit 20C, control signals that represent of the thus set control values of the rotation speeds to the first, second, and third motors 7A, 7B, and 7C, via circuits such as the A/D converter 20D. That is, the control unit 20 can automatically control the first, second, and third motors 7A, 7B, and 7C and also the first, second, and third rollers 2A, 2B, and 2C on the basis of preset values of appropriate rotation speed differences between the first rotation speed and the second rotation speed.

The composite shaping apparatus 1 and the composite shaping method as described above are designed so as to provide a rotation speed difference between the shaping first roller 2A and the shaping second and third rollers 2B and 2C that clamp the stack of prepreg P.

Advantageous Effects

Due to the features described above, the composite shaping apparatus 1 and the composite shaping method can prevent or reduce the wrinkles and warpage formed on the filler F that is a stack of prepreg P that has been shaped. As a result, the quality of the filler F can be improved. It has been confirmed that a filler F with restrained wrinkling and/or warpage has been restrained can actually be manufactured by providing an appropriate rotation speed difference between the first roller 2A and the second and third rollers 2B and 2C.

Second Embodiment

Figure 9:
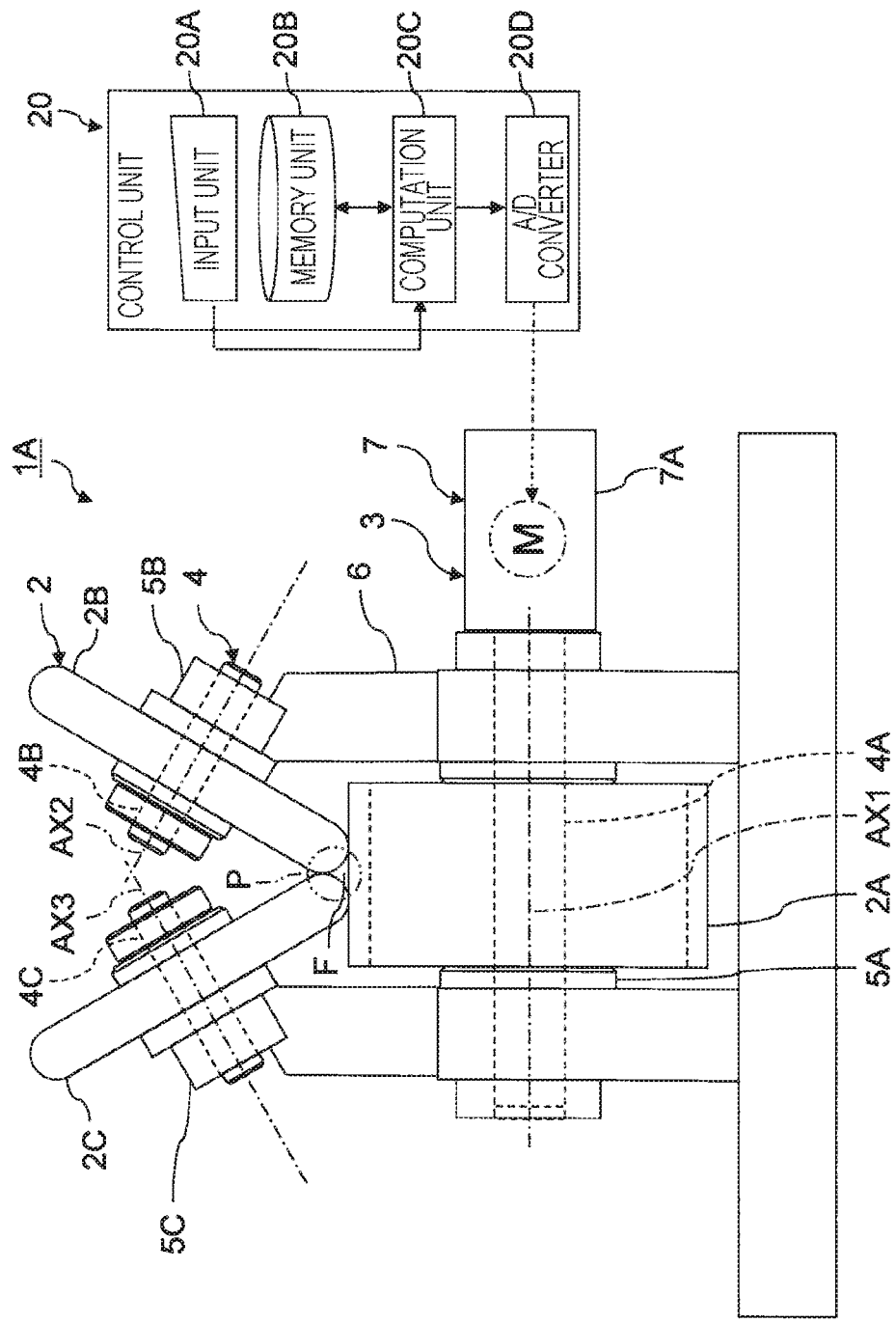
FIG. 9 is a configuration diagram of a composite shaping apparatus according to a second embodiment of the disclosure.

FIG. 9 is a configuration diagram of a composite shaping apparatus according to a second embodiment of the disclosure.

A composite shaping apparatus 1A in the second embodiment illustrated in FIG. 9 differs from the composite shaping apparatus 1 in the first embodiment in that the composite shaping apparatus 1A does not include second and third motors 7B and 7C for rotating second and third rollers 2B and 2C. Other configurations and operations of the composite shaping apparatus 1A of the second embodiment are substantially not different from those of the composite shaping apparatus 1 of the first embodiment. The same configurations as those in the first embodiment and configurations that correspond to those in the first embodiment are denoted by the same reference characters in the diagram and will not be described below.

The composite shaping apparatus 1A is provided with a first motor 7A that rotates a rotation shaft 4A of a first roller 2A. The second and third rollers 2B and 2C is not provided with a motor 7 that transmits rotating power to rotation shafts 4B and 4C of the second and third rollers 2B and 2C. Therefore, the composite shaping apparatus 1A is constructed so that the second and third rollers 2B and 2C are configured by friction force occurring between the second and third rollers 2B and 2C and the prepreg P, instead of the rotating power transmitted from the motor 7 to the rotation shafts 4B and 4C.

Specifically, the composite shaping apparatus 1A of the second embodiment is configured so that the cylindrical or hollow cylindrical first roller 2A whose surface in contact with a prepreg P has a constant speed v1 is rotated by the first motor 7A while the circular disc-shaped second and third rollers 2B and 2C whose surfaces in contact with the prepreg P have varying speeds v2 are rotated by friction force that occur between the surfaces and the prepreg P.

Therefore, the composite shaping apparatus 1A of the second embodiment can also provide a rotation speed difference between the first roller 2A and the second and third rollers 2B and 2C. In particular, the second and third rollers 2B and 2C can be rotated without a need to overcome friction force that occurs between the rollers 2B and 2C and the prepreg P. Therefore, the amount of sliding between the second and third rollers 2B and 2C and the prepreg P can be reduced. As a result, the wrinkles and warpage that can occur on the filler F can be prevented or reduced, so that the quality of the filler F can be improved.

Furthermore, since the motor 7 is made up of only the first motor 7A, the configuration of the composite shaping apparatus 1A can be simplified and the electric power consumption can be reduced.

Note that, as described above in conjunction with the first embodiment, the appropriate rotation speed difference between the first roller 2A and the second and third rollers 2B and 2C changes with shaping conditions. Therefore, it can be determined according to the shaping conditions whether to rotate the second and third rollers 2B and 2C by giving rotating power from the second and third motors 7B and 7C to the rotation shafts 4B and 4C of the second and third rollers 2B and 2C as in the first embodiment or to rotate the second and third rollers 2B and 2C by friction force that occurs between the second and third rollers 2B and 2C and the prepreg P without transmitting rotating power from the motor 7 to the rotation shafts 4B and 4C of the second and third rollers 2B and 2C as in the second embodiment.

Specifically, besides the rotation speeds of the first, second, and third rollers 2A, 2B, and 2C, the presence/absence of rotating power transmitted to the rotation shafts 4A, 4B, and 4C of the first, second, and third rollers 2A, 2B, and 2C can also be determined according to at least one of the material of prepregs P, the temperature at which the stack of prepreg P is loaded with pressure, the humidity at which the stack of prepreg P is loaded with pressure, the angle between the first axis AX1 of the first roller 2A and each of the second and third axes AX2 and AX3 of the second and third rollers 2B and 2C, or the radii of each of the circular disc-shaped second and third rollers 2B and 2C measured at the end portion of a vertical section thereof.

It is to be noted that the composite shaping apparatus 1 of the first embodiment can also rotate the second and third rollers 2B and 2C only by the friction force produced between the second and third rollers 2B and 2C and the prepreg P by switching off the electric power supply for the second and third motors 7B and 7C. Therefore, the use of the composite shaping apparatus 1 of the first embodiment makes it possible to switch between the rotation of the second and third rollers 2B and 2C driven by the second and third motors 7B and 7C and the rotation of the rollers 2B and 2C by friction force between the rollers 2B and 2C and the prepreg P, according to the shaping conditions.

Third Embodiment

Figure 10:
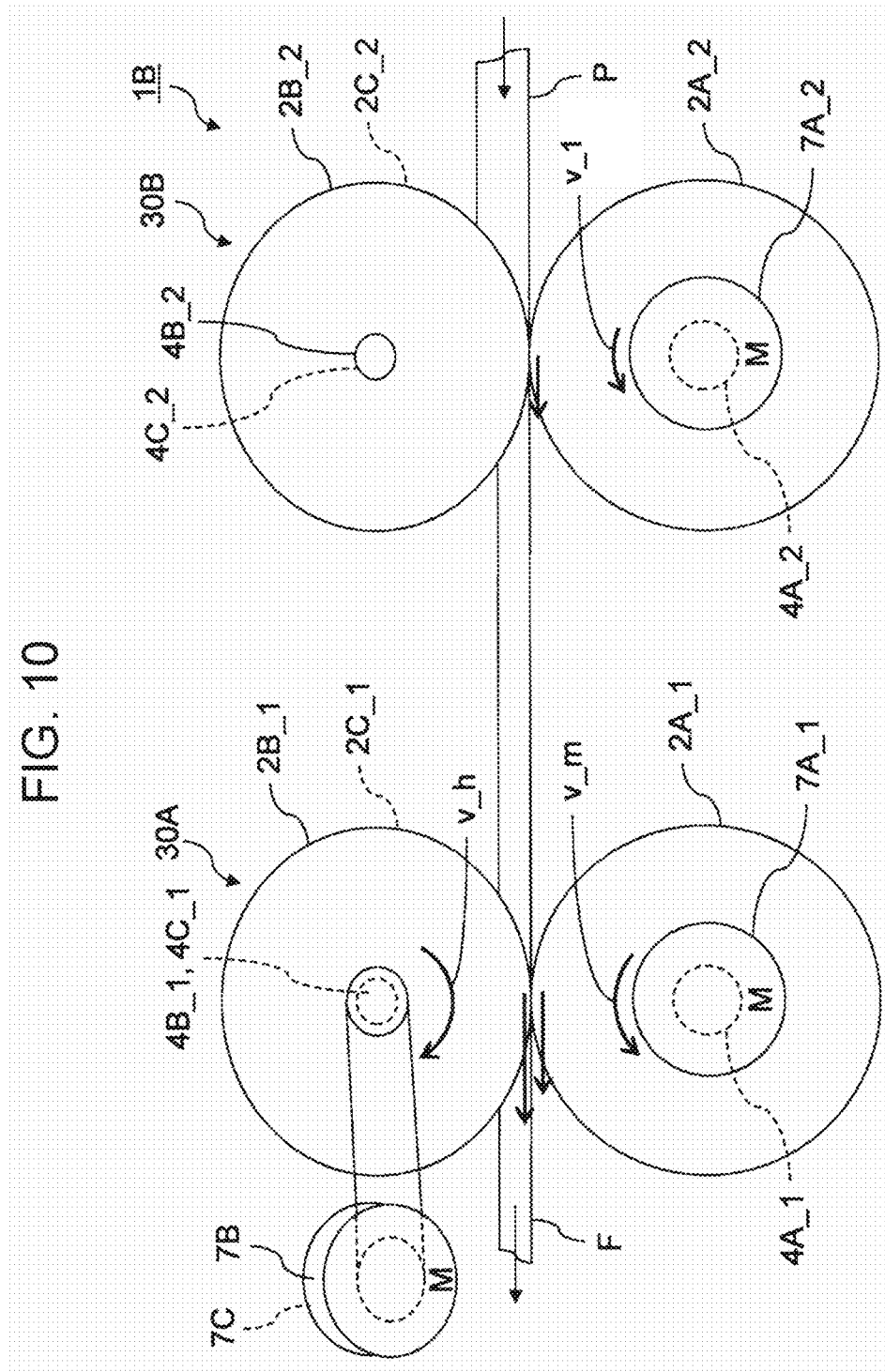
FIG. 10 is a configuration diagram of a composite shaping apparatus according to a third embodiment of the disclosure.

FIG. 10 is a configuration diagram of a composite shaping apparatus according to a third embodiment of the disclosure.

A composite shaping apparatus 1B of the third embodiment illustrated in FIG. 10 is different from the composite shaping apparatus 1 of the first embodiment in that the composite shaping apparatus 1B of the third embodiment includes two roller units 30A and 30B each of which is made up of first, second, and third rollers 2A, 2B, and 2C. Other configurations and operations of the composite shaping apparatus 1B of the third embodiment are substantially not different from those of the composite shaping apparatus 1 of the first embodiment. Therefore, FIG. 10 illustrates only the rollers 2 and a motor 7. The same configurations as and the configurations that correspond to those of the composite shaping apparatus 1 described above are denoted by the same reference characters and will not be described below.

In the composite shaping apparatus 1B of the third embodiment, the first roller unit 30A and the second roller unit 30B are disposed at different positions in the feeding direction of the stack of prepreg P and the filler F.

The first roller unit 30A is made up of first, second, and third rollers 2A_1, 2B_1, and 2C_1 as a plurality of subsidiary rollers disposed at such positions as to clamp a bar-shaped stack of prepreg P at a front position. More concretely, the first roller unit 30A is made up of a cylindrical or hollow cylindrical first roller 2A_1 that rotates about a first axis AX1 and two circular disc-shaped rollers, that is, second and third rollers 2B_1 and 2C_1, that rotate about second and third axes AX2 and AX3 that are inclined with respect to the first axis AX1 and mutually symmetric with respect to a plane perpendicular to the first axis AX1. The first, second, and third rollers 2A_1, 2B_1, and 2C_1, which are a first plurality of rollers that constitute the first roller unit 30A, are disposed so that a space that corresponds to a cross-sectional shape of the filler F is formed between the first, second, and third rollers 2A_1, 2B_1, and 2C_1.

Therefore, rotation of the first, second, and third rollers 2A_1, 2B_1, and 2C_1 that constitute the first roller unit 30A will feed the stack of prepreg P forward and, simultaneously, shape the filler F at a first position that is a front position in a feeding direction.

On the other hand, the second roller unit 30B is made up of first, second, and third rollers 2A_2, 2B_2, and 2C_2 as a plurality of subsidiary rollers that are disposed at a rear position so as to clamp the bar-shaped stack of prepreg P. More concretely, the second roller unit 30B is made up of a second plurality of subsidiary rollers that are, in this embodiment, the cylindrical or hollow cylindrical first roller 2A_2 that rotates about a first axis AX1 and two rollers that are the circular disc-shaped second and third rollers 2B_2 and 2C_2 that rotate about second and third axes AX2 and AX3, respectively, that are inclined with respect to the first axis AX1 and symmetrical to each other with respect to a plane perpendicular to the first axis AX1. The first, second, and third rollers 2A_2, 2B_2, and 2C_2 as a second plurality of subsidiary rollers that constitute the second roller unit 30B are disposed so that a space that corresponds to a cross-sectional shape of a filler F is formed between the first, second, and third rollers 2A_2, 2B_2, and 2C_2.

Therefore, rotation of the first, second, and third rollers 2A_2, 2B_2, and 2C_2 that constitute the second roller unit 30B will feed the stack of prepreg P forward and, simultaneously, shape the filler F at a second position that is different from and in rear of the first position in the feeding direction.

The first, second, and third rollers 2A_1, 2B_1, and 2C_1 that constitute the first roller unit 30A are rotated by the rotating power transmitted from the first, second, and third motors 7A_1, 7B, and 7C. Specifically, the first, second, and third motors 7A_1, 7B, and 7C rotate the first, second, and third rollers 2A_1, 2B_1, and 2C_1 by transmitting rotating power to rotation shafts 4A_1, 4B_1, and 4C_1 of the first, second, and third rollers 2A_1, 2B_1, and 2C_1, respectively.

Note that a rotation speed difference is provided between the rotation speed of the first roller 2A_1 and that of the second and third rollers 2B_1 and 2C_1. Concretely, the first motor 7A_1 is configured to rotate the rotation shaft 4A_1 of the first roller 2A_1 at a first rotation speed v_m. On the other hand, the second and third motors 7B and 7C are configured to rotate the rotation shafts 4B_1 and 4C_1 of the second and third rollers 2B_1 and 2C_1, respectively, at a second rotation speed v_h that is faster than the first rotation speed v_m.

Therefore, the first roller unit 30A has substantially the same configuration and functions as the composite shaping apparatus 1 of the first embodiment. Therefore, formation of wrinkles and warpage on the filler F shaped by the first roller unit 30A can be restrained.

Of the first, second, and third rollers 2A_2, 2B_2, and 2C_2 that constitute the second roller unit 30B, the second and third rollers 2B_2 and 2C_2 are configured to be rotated by friction force that occurs between the rollers 2B_2 and 2C_2 and the prepreg P, not by the rotating power transmitted from the motor 7 to rotation shafts 4B_2 and 4C_2 of the second and third rollers 2B_2 and 2C_2. Therefore, the first roller 2A_2 is connected to a motor 7A_2 that rotates the first roller 2A_2 by transmitting rotating power to a rotation shaft 4A_2 of the first roller 2A_2. In contrast, the rotation shafts 4B_2 and 4C_2 of the second and third rollers 2B_2 and 2C_2 are not connected to the motor 7.

Therefore, the second roller unit 30B has substantially the same configuration and functions as the composite shaping apparatus 1A of the second embodiment. Hence, the filler F shaped by the second roller unit 30B is also substantially prevented from having wrinkles and warpage.

Furthermore, a rotation speed difference can also be provided between the rotation speed of the first roller unit 30A and the second roller unit 30B. Specifically, while the rotation shaft 4A_1 of the first roller 2A_1 that constitutes the first roller unit 30A is rotated at the first rotation speed v_m by rotational driving of the first motor 7A_1, the rotation shaft 4A_2 of the first roller 2A_2 that constitutes the second roller unit 30B can be rotated at a third rotation speed v_1 that is slower than the first rotation speed v_m by rotational driving of the motor 7A_2. That is, the first roller unit 30A and the second roller unit 30B can be controlled so that the rotation speed of the first roller unit 30A disposed at a side near the outlet of the stack of prepreg P is greater than the rotation speed of the second roller unit 30B disposed at a side near the inlet of the stack of prepreg P.

Then, tensile force is produced in the filler F between the first roller unit 30A and the second roller unit 30B. Therefore, slackening of the filler F between the first roller unit 30A and the second roller unit 30B can be prevented. This makes it possible to inhibit deformation of the filler F and shape the filler F more linearly.

If tensile force can be produced in the filler F between the first roller unit 30A and the second roller unit 30B, it is also possible to cause the rotating power from the motor 7 to act on all of the first, second, and third rollers 2A_2, 2B_2, and 2C_2 that constitute the second roller unit 30B. Note that if the second and third rollers 2B_2 and 2C_2 that constitute the second roller unit 30B are configured so as not to be rotated by the motor 7 as illustrated in FIG. 10, the configuration of the composite shaping apparatus 1B can be simplified and, at the same time, tensile force can be produced in the filler F between the first roller unit 30A and the second roller unit 30B.

That is, if sufficiently large motive power is given to the first roller unit 30A that is disposed on a feeding side, it often becomes possible to achieve both the feeding of the filler F and production of tensile force. Therefore, the configuration example illustrated in FIG. 10 is one of preferable configurations from the viewpoint of reduction of electric power consumption achieved by the simplified configuration and the reduced number of motors 7 and of improvement of quality achieved by the retained linearity of the filler F after shaping.

In the case where two sets of roller units 30A and 30B are disposed as illustrated in FIG. 10, the rotation speed difference between the rollers 2 and the presence/absence of rotating power given to the rollers 2 can be set. Specifically, the rotation speed difference between the rollers 2 and the presence/absence of rotating power given to the rollers 2 can be set according to, for example, at least one of the material of prepregs P, the temperature at which stack of prepreg P is loaded with pressure, the humidity at which the stack of prepreg P is loaded with pressure, the inclination angles of the circular disc-shaped second and third rollers 2B_1, 2C_1, 2B_2, and 2C_2, or the radii of the circular disc-shaped second and third rollers 2B_1, 2C_1, 2B_2, and 2C_2 measured at end portions of vertical sections of the rollers.

Figure 11:
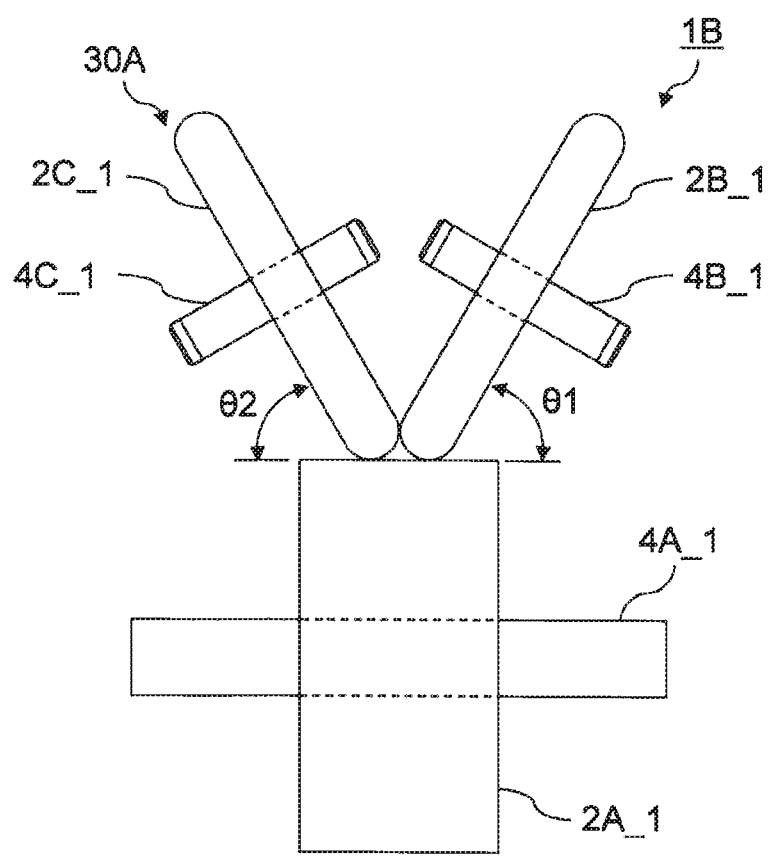
FIG. 11 is a left side view of a first roller unit illustrated in FIG. 10.
Figure 12:
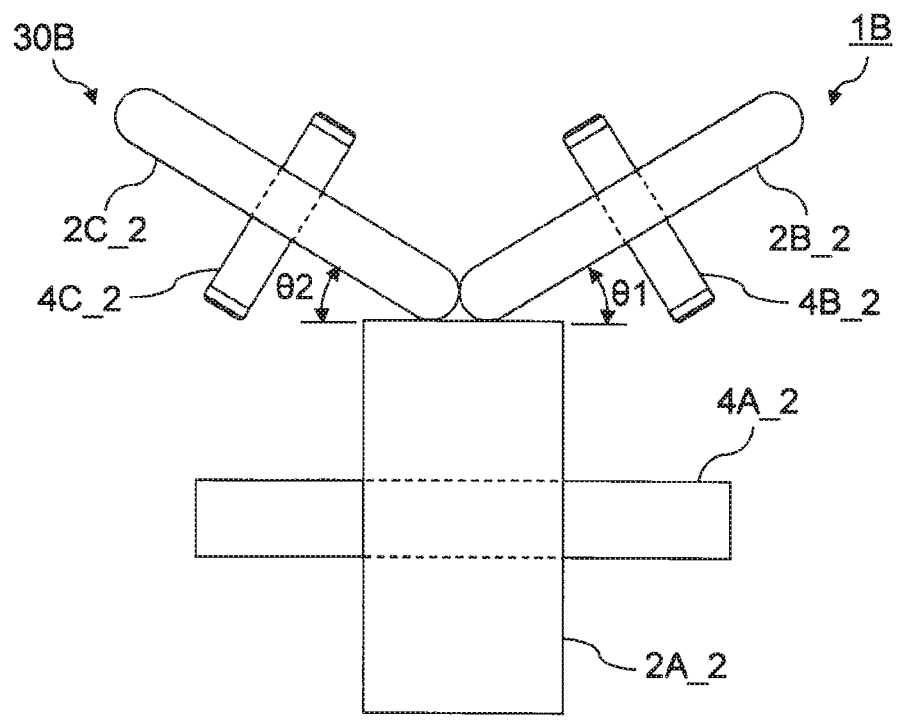
FIG. 12 is a left side view of a second roller unit illustrated in FIG. 10.

FIG. 11 illustrates a left side view of the first roller unit 30A illustrated in FIG. 10. FIG. 12 illustrates a left side view of the second roller unit 30B illustrated in FIG. 10.

In the case where the two roller units 30A and 30B are used to shape a filler F, the inclination angles of the circular disc-shaped second and third rollers 2B_1, 2C_1, 2B_2, and 2C_2 can be made different between the roller units 30A and 30B. As a concrete example, in the first roller unit 30A, the angles $\theta 1$ and $\theta 2$ at which the circular disc-shaped second and third rollers 2B_1 and 2C_1 pressed against the cylindrical or hollow cylindrical first roller 2A_1 can be set to 60 degrees as illustrated in FIG. 11. In the second roller unit 30B, on the other hand, the angles $\theta 1$ and $\theta 2$ at which the circular disc-shaped second and third rollers 2B_2 and 2C_2 are pressed against the cylindrical or hollow cylindrical first roller 2A_2 can be set to 36.87 degrees as illustrated in FIG. 12.

As described above in conjunction with the first embodiment, when the angles $\theta 1$ and $\theta 2$ at which the circular disc-shaped second and third rollers 2B and 2C are pressed against the first roller 2A is set to the 36.87 degrees, the stack of prepreg P can be uniformly loaded with a compression force. When the angles $\theta 1$ and $\theta 2$ at which the circular disc-shaped rollers 2B and 2C are pressed against the first roller 2A is set to 60 degrees, the flatness of the lower surface of the filler F can be improved.

Therefore, the second roller unit 30B that loads the round bar-shaped stack of prepreg P with pressure can uniformly apply compression force to the stack of prepreg P. This will improve quality within the filler F. Furthermore, because the filler F shaped by the second roller unit 30B is further shaped by the first roller unit 30A, the flatness of the lower surface of the filler F can be improved.

As can be understood from the foregoing description, the composite shaping apparatus 1B of the third embodiment includes the two roller units 30A and 30B whose rotation speeds can be adjusted is capable of providing rotation speed differences not only between the rollers 2 that together clamp the stack of prepreg P but also between the roller units 30A and 30B that separately clamp the stack of prepreg P at different positions. Therefore, the composite shaping apparatus 1B of the third embodiment achieves substantially the same advantageous effects as those achieved by the composite shaping apparatus 1 of the first embodiment and further achieves an advantageous effect of further improving the linearity of the shaped filler F by producing tension in the stack of prepreg P.

Furthermore, because the angles at which the circular disc-shaped second and third rollers 2B and 2C are pressed against the first roller 2A can be set to appropriate angles different between the roller units 30A and 30B, the quality of the shaped filler F can be further improved. Concretely, both uniformity within the filler F and flatness of the lower surface of the filler F can be improved.

Fourth Embodiment

Figure 13:
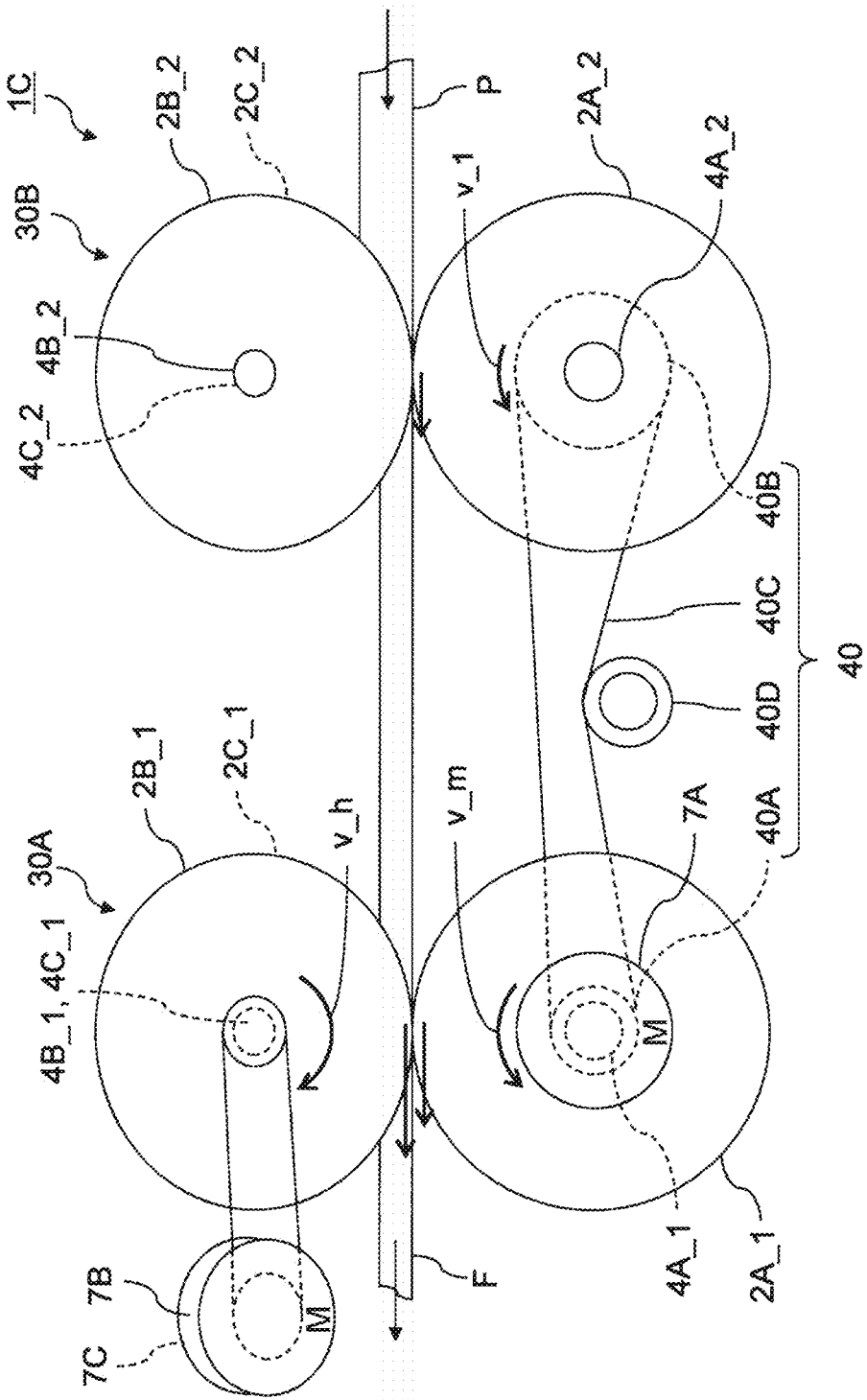
FIG. 13 is a configuration diagram of a composite shaping apparatus according to a fourth embodiment of the disclosure.

FIG. 13 is a configuration diagram of a composite shaping apparatus according to a fourth embodiment of the disclosure.

A composite shaping apparatus 1C of the fourth embodiment illustrated in FIG. 13 differs from the composite shaping apparatus 1B of the third embodiment in that a first roller 2A_1 that constitutes a first roller unit 30A and a first roller 2A_2 that constitutes a second roller unit 30B are provided with a rotation speed difference and rotated by a single common first motor 7A. Other configurations and operations of the composite shaping apparatus 1C of the fourth embodiment are substantially not different from those of the composite shaping apparatus 1B of the third embodiment. Therefore, FIG. 13 illustrates only rollers 2 and motors 7. The same configurations as and configurations that correspond to those of the apparatus 1B described above are denoted by the same reference characters and will not be described below.

As illustrated in FIG. 13, the composite shaping apparatus 1C can be configured so that rotating power from the common first motor 7A is transmitted to both the first roller 2A_1 that constitutes the first roller unit 30A and the first roller 2A_2 that constitutes the second roller unit 30B.

As a concrete example, an output shaft of the first motor 7A can be coaxially connected to an end of a rotation shaft 4A_1 of the first roller 2A_1 that constitutes the first roller unit 30A. A third pulley 40A can be fixed to the other end of the rotation shaft 4A_1 of the first roller 2A_1 that constitutes the first roller unit 30A. An end of a rotation shaft 4A_2 of the first roller 2A_2 that constitutes the second roller unit 30B which is on the same side as the end of the rotation shaft 4A_1 provided with the fixed third pulley 40A can be provided with a fixed fourth pulley 40B.

The third pulley 40A fixed to the rotation shaft 4A_1 of the first roller 2A_1 that constitutes the first roller unit 30A and the fourth pulley 40B fixed to the rotation shaft 4A_2 of the first roller 2A_2 that constitutes the second roller unit 30B can be interconnected by a power transmission belt 40C. Incidentally, the example illustrated in FIG. 13 includes a fifth pulley 40D that applies a pressing force to the power transmission belt 40C from its outer side in order to maintain a tension of the power transmission belt 40C.

Thus, the third pulley 40A, the fourth pulley 40B, the power transmission belt 40C, and the fifth pulley 40D constitute a power transmission mechanism 40 that transmits rotating power from the first motor 7A to both the rotation shaft 4A_1 of the first roller 2A_1 that constitutes the first roller unit 30A and the rotation shaft 4A_2 of the first roller 2A_2 that constitutes the second roller unit 30B.

The diameter of the third pulley 40A fixed to the first roller 2A_1 of the first roller unit 30A and the diameter of the fourth pulley 40B fixed to the first roller 2A_2 of the second roller unit 30B may be different from each other. This makes it possible for the common first motor 7A to rotate the first roller 2A_1 of the first roller unit 30A and the first roller 2A_2 of the second roller unit 30B at different rotation speeds v_m and v_1. That is, the first roller 2A_1 of the first roller unit 30A and the first roller 2A_2 of the second roller unit 30B can be given a rotation speed difference.

More concretely, when the diameter of the fourth pulley 40B fixed to the first roller 2A_2 of the second roller unit 30B is larger than the diameter of the third pulley 40A fixed to the first roller 2A_1 of the first roller unit 30A, the rotation speed v_1 of the first roller 2A_2 of the second roller unit 30B is made slower than the rotation speed v_m of the first roller 2A_1 of the first roller unit 30A.

Therefore, it becomes possible to feed out the filler F with tension occurring in the filler F between the first roller 2A_1 of the first roller unit 30A and the first roller 2A_2 of the second roller unit 30B. This will prevent the shaped filler F from having wrinkles or warpage.

The ratio between the rotation speeds v_m and v_1 of the two first rollers 2A_1 and 2A_2 is equal to the ratio between the lengths of the circumferences of the third pulley 40A and the fourth pulley 40B. Therefore, an appropriate difference or ratio between the diameters of the third pulley 40A and the fourth pulley 40B can be determined beforehand by a shaping test. Therefore, the difference between the rotation speeds v_m and v_1 can always be provided as a fixed ratio, despite changes in the rotation speed of the first motor 7A.

Of course, the power transmission mechanism 40 do not necessarily need to be constructed of the pulleys 40A, 40B, and 40D and the power transmission belt 40C but can instead be constructed of other desired components such as a gear train or sprockets engaged with a chain. In that case, too, it is appropriate to construct the power transmission mechanism 40 on a shaping test so that an appropriate rotation speed difference or rotation speed ratio will be provided between the two first rollers 2A_1 and 2A_2.

The foregoing composite shaping apparatus 1C of the fourth embodiment is configured so that the two first rollers 2A_1 and 2A_2 that constitute the two roller units 30A and 30B are rotated by the common first motor 7A. Therefore, the composite shaping apparatus 1C of the fourth embodiment achieves substantially the same advantageous effects as the composite shaping apparatus 1B of the third embodiment and further achieves advantageous effects of further reducing the number of motors 7 and facilitating the control of the motors 7.

Of course, the composite shaping apparatus 1C can be configured so as to rotate not only the first rollers 2A_1 and 2A_2 but a plurality of arbitrary rollers 2 by using a common motor 7. In particular, a plurality of rollers 2 whose rotation axes are parallel can be easily configured to be driven by a common motor 7 through the use of a power transmission made up of a belt, pulleys, etc.

Fifth Embodiment

Figure 14:
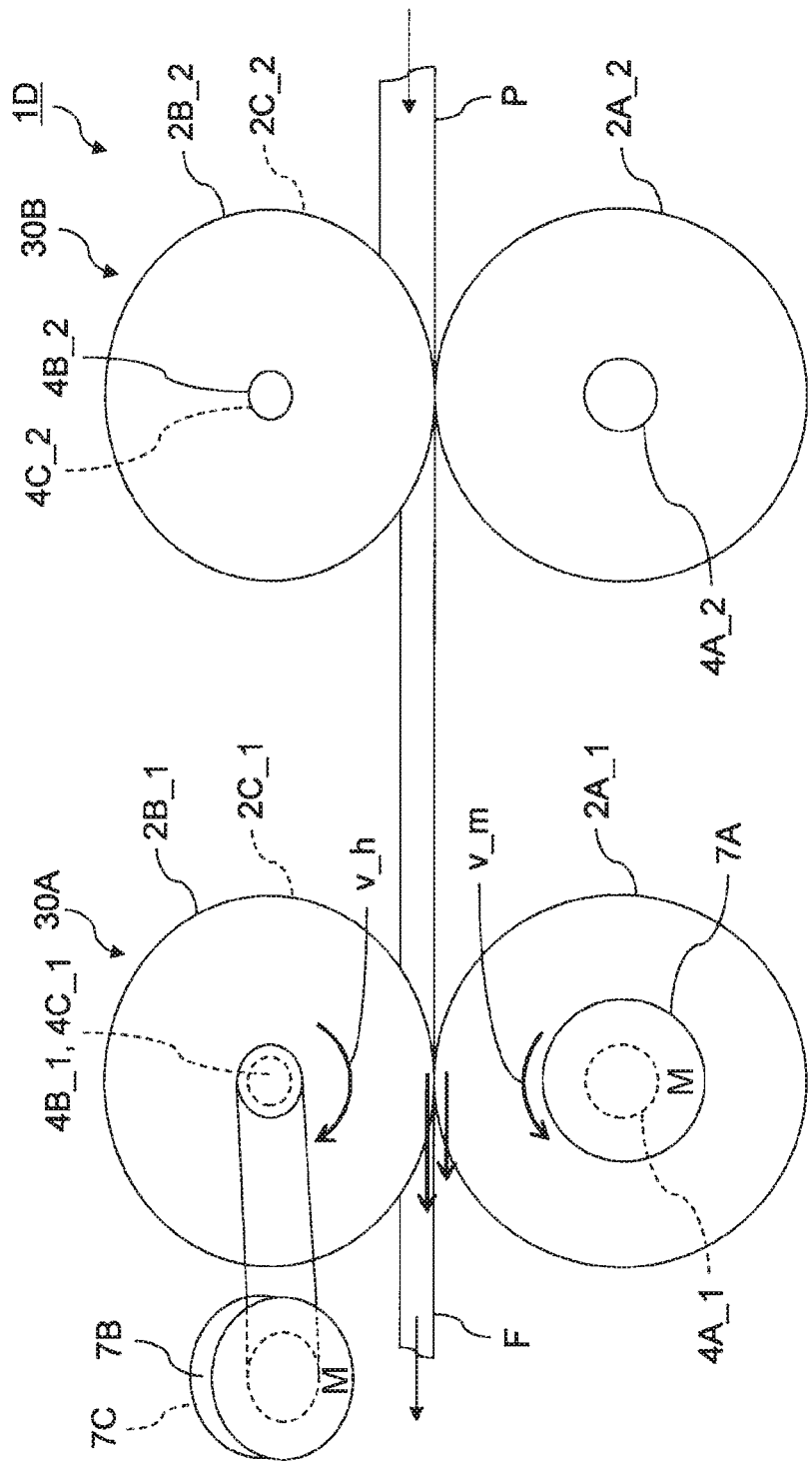
FIG. 14 is a configuration diagram of a composite shaping apparatus of a fifth embodiment disclosure.

FIG. 14 is a configuration diagram of a composite shaping apparatus according to a fifth embodiment of the disclosure.

A composite shaping apparatus 1D of the fifth embodiment illustrated in FIG. 14 differs from the composite shaping apparatus 1B of the third embodiment in that none of first, second, and third rollers 2A_2, 2B_2, and 2C_2 that constitute the second roller unit 30B is provided with a motor 7 for producing rotating power. Other configurations and operations of the composite shaping apparatus 1D of the fifth embodiment are substantially not different from those of the composite shaping apparatus 1B of the third embodiment. Therefore, FIG. 14 illustrates only the rollers 2 and the motor 7. The same configurations as and configurations that correspond to those of the apparatus 1B described above are denoted by the same reference characters and will not be described below.

As illustrated in FIG. 14, all the first, second, and third rollers 2A_2, 2B_2, and 2C_2 that constitute the second roller unit 30B may be rotated by utilizing friction force produced with prepregs P, instead of using a motor 7 from which rotating power is transmitted to the first, second, and third rollers 2A_2, 2B_2, and 2C_2. That is, it is permissible that while the first roller unit 30A is given rotating powers produced by first, second, and third motors 7A, 7B, and 7C, the second roller unit 30B be rotated by friction force produced with the prepregs P, without rotating power transmitted from a motor.

In this case, the rotation speeds of the first, second, and third rollers 2A_2, 2B_2, and 2C_2 can be adjusted by adjusting the friction resistance produced with respect to rotation of the first, second, and third rollers 2A_2, 2B_2, and 2C_2 that constitute the second roller unit 30B.

In the composite shaping apparatus 1D of the fifth embodiment configured in this manner, tensile force can be produced in the filler F between the first roller unit 30A and the second roller unit 30B. Therefore, similar to the composite shaping apparatus 1B of the third embodiment, the composite shaping apparatus 1D of the fifth embodiment can further improve the linearity of the shaped filler F. Furthermore, the composite shaping apparatus 1D of the fifth embodiment allows the number of motors 7 to be reduced, in comparison with the composite shaping apparatus 1B of the third embodiment.

Sixth Embodiment

Figure 15:
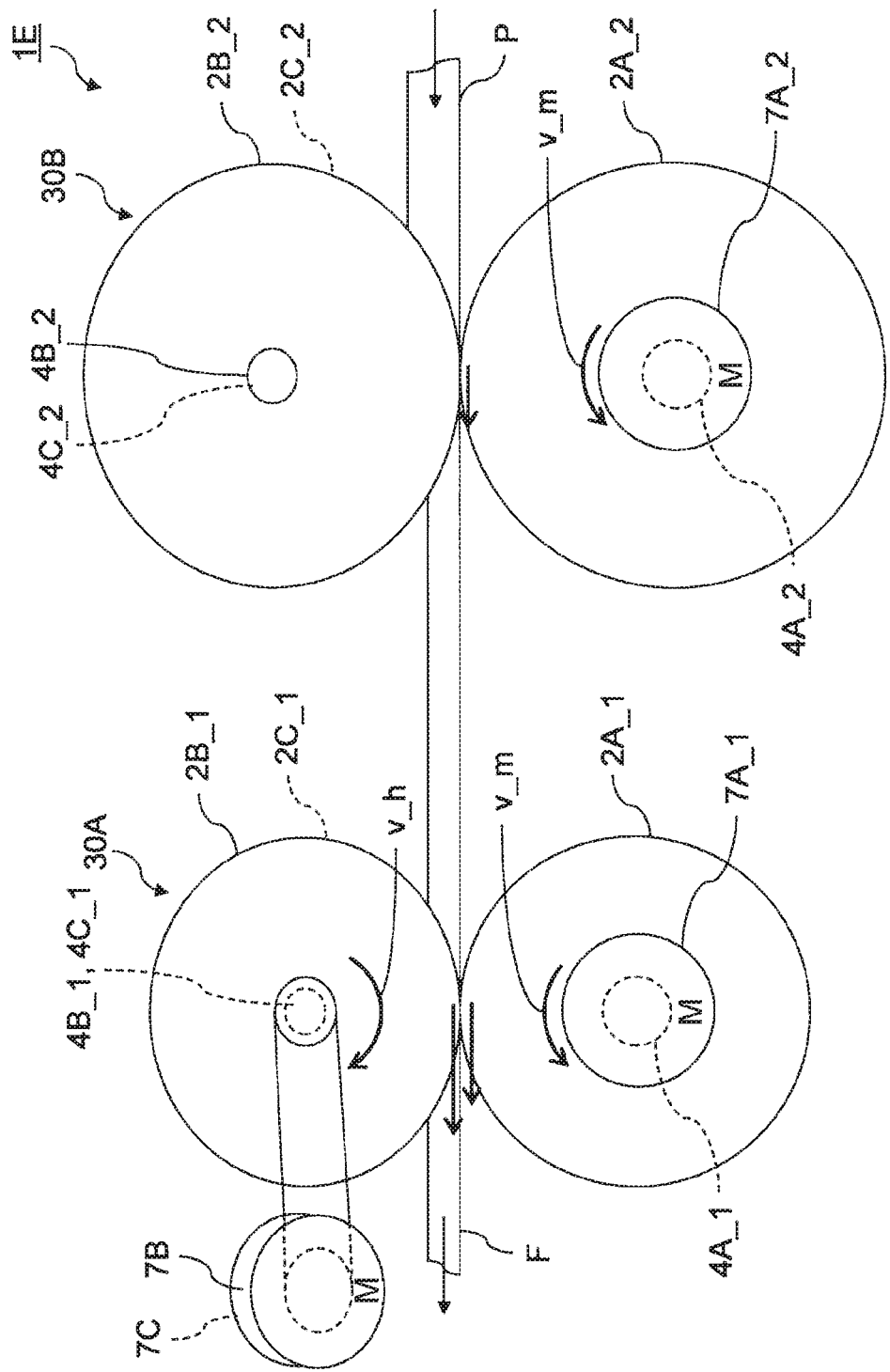
FIG. 15 is a configuration diagram of a composite shaping apparatus according to a sixth embodiment of the disclosure.

FIG. 15 is a configuration diagram of a composite shaping apparatus according to a sixth embodiment of the disclosure.

A composite shaping apparatus 1E of the sixth embodiment illustrated in FIG. 15 differs from the composite shaping apparatus 1B of the third embodiment in that the apparatus 1E is configured to provide a rotation speed difference between rollers 2 by making the roller diameters different. Other configurations and operations of the composite shaping apparatus 1E of the sixth embodiment are substantial not different from those of the composite shaping apparatus 1B of the third embodiment. Therefore, FIG. 15 illustrates only rollers 2 and motors 7. The same configurations as and configurations that correspond to those of the apparatus 1B of the third embodiment are denoted by the same reference characters and will not be described below.

Although the third to fifth embodiments have been described above on the precondition that the first roller 2A_1 of the first roller unit 30A and the first roller 2A_2 of the second roller unit 30B have the same diameter, the diameter of the first roller 2A_1 of the first roller unit 30A and the diameter of the first roller 2A_2 of the second roller unit 30B may be different from each other as illustrated in FIG. 15.

In this case, a surface of the first roller 2A_1 of the first roller unit 30A and a surface of the second roller 2A_2 of the second roller unit 30B that are in contact with a prepreg P can be moved at different speeds even when the rotation speed of the first roller 2A_1 of the first roller unit 30A and the rotation speed of the first roller 2A_2 of the second roller unit 30B are the same. More concretely, making the roller diameter of the first roller 2A_2 of the second roller unit 30B larger than the roller diameter of the first roller 2A_1 of the first roller unit 30A as illustrated in FIG. 15 will make it possible to make the moving speed of the surface of the first roller 2A_2 of the second roller unit 30B that is in contact with the prepreg P slower than the moving speed of the surface of the first roller 2A_1 of the first roller unit 30A that is in contact with the prepreg P even when the rotation speeds of the two first rollers 2A_1 and 2A_2 are equal to a rotation speed v_m.

This makes it possible to feed out the filler F while producing tension in the filler F between the first roller 2A_1 of the first roller unit 30A and the first roller 2A_2 of the second roller unit 30B. As a result, it becomes possible to prevent the shaped filler F from having wrinkles or warpage.

The ratio between the moving speeds of the surfaces of the two first rollers 2A_1 and 2A_2 is equal to the ratio between the roller diameters of the first rollers 2A_1 and 2A_2. Therefore, an appropriate difference or ratio between the roller diameters of the first rollers 2A_1 and 2A_2 can be determined beforehand by a shaping test.

Furthermore, the difference or ratio between the maximum diameters of the first rollers 2A_1 and 2A_2 and the second and third rollers 2B_1, 2C_1, 2B_2, and 2C_2 that clamp the filler F can also be appropriately determined beforehand by a shaping test.

In the composite shaping apparatus 1E of the sixth embodiment configured as described above, a tensile force can be produced in the filler F between the first roller unit 30A and the second roller unit 30B. Therefore, similar to the composite shaping apparatus 1B of the third embodiment, the composite shaping apparatus 1E of the sixth embodiment can also further improve the linearity of the shaped filler F.

Furthermore, the composite shaping apparatus 1E of the sixth embodiment can improve the quality of the filler F by producing a tensile force in the filler F, without a need to control the motors 7. Therefore, the composite shaping apparatus 1E can be constructed by using a simple arrangement of the motors 7 and a circuit. It is also permissible that the moving speeds of the surfaces of the rollers 2 be made roughly suitable by appropriately determining the maximum roller diameters of the rollers 2 and that the moving speed of the surfaces of the rollers 2 be finely adjusted by controlling the motors 7.

Seventh Embodiment

Figure 16:
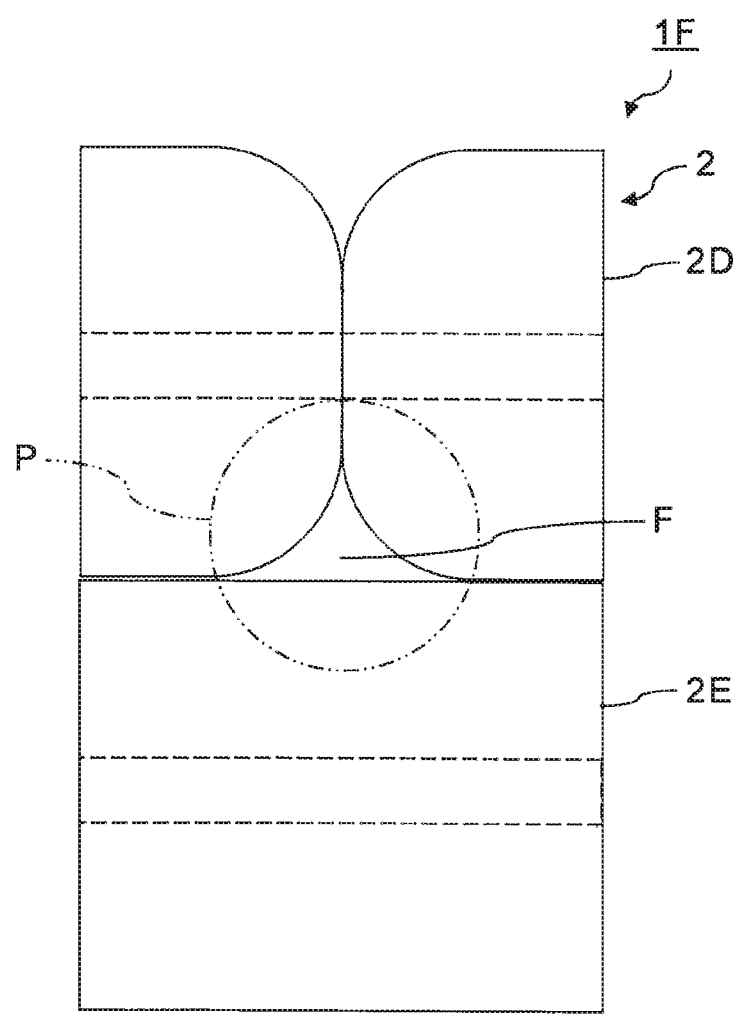
FIG. 16 is a configuration diagram of a composite shaping apparatus according to a seventh embodiment of the disclosure.

FIG. 16 is a configuration diagram of a composite shaping apparatus according to a seventh embodiment of the disclosure.

A composite shaping apparatus 1F of the seventh embodiment illustrated in FIG. 16 differs from the composite shaping apparatuses 1, 1A, 1B, 1C, 1D, and 1E of the first to sixth embodiments in that the apparatus 1F shapes the filler F by using two rollers 2D and 2E. Other configurations and operations of the composite shaping apparatus 1F of the seventh embodiment are substantially not different from those of the composite shaping apparatuses 1, 1A, 1B, 1C, 1D, and 1E of the first to sixth embodiments. Therefore, FIG. 16 illustrates only the rollers 2D and 2E, and the same configurations as and configurations that correspond to those of the apparatuses described above will not be described below.

As illustrated in FIG. 16, in the composite shaping apparatus 1F of the seventh embodiment, a bar-shaped stack of prepreg P that is a material of a filler F is clamped by the two cylindrical or hollow cylindrical first and second rollers 2D and 2E, and a surface of one of the two cylindrical or hollow cylindrical rollers 2D and 2E is provided with a recess that corresponds to a cross-sectional shape of the filler F. In the example illustrated in FIG. 16, the first roller 2D is disposed at an upper side and provided with a recess that corresponds a cross-sectional shape of the filler F, and the second roller 2E is disposed at a lower side and provided with no recess and with a uniform diameter. The first roller 2D and the second roller 2E are disposed at such positions as to clamp the bar-shaped stack of prepreg P.

In this embodiment, a speed difference can be provided between the rotation speeds of the first roller 2D and the second roller 2E as in the first embodiment. Alternatively, the second roller 2E can be rotated by the motor 7 while the first roller 2D is rotated by the friction force with the prepreg P, as in the second embodiment. Furthermore, as in the third to sixth embodiments, two roller units each constructed of a first roller 2D and a second roller 2E can be disposed. Furthermore, the maximum roller diameters of the first roller 2D and the second roller 2E that clamp the stack of prepreg P can be made different from each other.

The composite shaping apparatus 1F of the seventh embodiment described above, compared with the composite shaping apparatuses 1, 1A, 1B, 1C, 1D, and 1E of the first to sixth embodiment, has a fewer rollers 2 and therefore allows the configuration and control of the composite shaping apparatus 1F to be simplified.

Other Embodiments

While specific embodiments of the disclosure have been described, it is to be noted that the foregoing embodiments are mere illustrative and not intended to limit the scope of the disclosure. The novel methods and apparatuses described herein can be embodied in various modes other than those described above. The modes of the methods and apparatuses described herein can be subjected to various changes and modifications, including omissions and replacements in various manners, without departing from the gist of the disclosure. It is to be understood that what are described in the appended claims and their equivalents are encompassed in the scope and gist of the disclosure and include various modes and modifications.

For instance, features of the composite shaping apparatuses 1, 1A, 1B, 1C, 1D, 1E, and 1F of the foregoing embodiments can be combined with one another. Conversely, one or more features of any one of the composite shaping apparatuses 1, 1A, 1B, 1C, 1D, 1E, and 1F can be omitted. Specifically, a composite shaping apparatus can be constructed of at least one first roller that loads a stack of prepreg P with pressure, at least one second roller that loads the stack of prepreg P with pressure, and a motor that rotates at least one of the first roller or the second roller. Furthermore, a shaped prepreg P can be manufactured by rotating at least one of the at least one first roller or the at least one second roller provided in the composite shaping apparatus through the use of the motor and therefore loading the prepreg P with pressure while feeding the prepreg P by the first roller and the second roller. Then, it is possible to rotate the first roller and the second roller with difference made between the two roller in at least one of friction resistance to rotation, rotation speed, roller diameter, or the presence/absence of rotating power. This will reduce the wrinkles and warpage that can occur on the prepreg P.

Furthermore, although in the foregoing embodiments, vertical sections of the circular disc-shaped rollers have arc shapes, circular disc-shaped rollers whose vertical sections do not have arc shapes may also be used. As a concrete example, a composite shaping apparatus may also be constructed by using circular disc-shaped rollers whose vertical sections have at their ends the shape of a curve whose curvature is not constant, such as a logarithmic spiral, as described and illustrated in the claims, specification, and drawings of Japanese Patent Application No. 2016-31792. In such a case, the composite shaping apparatus may be provided with an angle adjustment mechanism that continuously changes the inclination angles of the rotation axes of circular disc-shaped rollers.

In the case where the inclination angles of the rotation axes of circular disc-shaped rollers are changed during the shaping of a filler F, the rotation speeds of the circular disc-shaped rollers can also be changed in accordance with the inclination angles of the rotation axes of the circular disc-shaped roller during the shaping. This makes possible the high-quality shaping of a filler F whose cross sections are not uniform. In particular, use of circular disc-shaped rollers whose vertical sections have at their end portions the shape of a part of logarithmic spiral allows the high-quality shaping of a filler F whose thickness varies over the length.

Furthermore, some fillers F have cross-sectional shapes that are not axially symmetric. In a concrete example, when a filler F is mounted on a surface that is not perpendicular to the direction of the height of the filler F, the cross-sectional shape of the filler F is not axially symmetric. When a filler F whose cross-sectional shape is not axially symmetric is to be shaped, the shapes and arrangement of the first, second, and third rollers 2A, 2B, and 2C can be determined beforehand in accordance with the shape of the filler F. As a concrete example, the first axis AX1 of the first roller 2A may be set in a direction that is not horizontal, in accordance with the shape of the filler F. Furthermore, the angles θ1 and θ2 of the direction in which the circular disc-shaped second roller 2B and third roller 2C are pressed against with respect to the surface of the first roller 2A may be set to mutually different angles in accordance with the shape of the filler F. Further, the radii of a circumferential surface of the circular disc-shaped second roller 2B and the radii of a circumferential surface of the third roller 2C may be set to mutually different lengths in accordance with the shape of the filler F.

The invention claimed is:

1. A composite shaping apparatus,
at least one first roller configured to load a prepreg with pressure;
at least one second roller configured to load the prepreg with pressure; and
at least one motor configured to rotate at least one of the at least one first roller or the at least one second roller,
wherein the at least one first roller and the at least one second roller are rotated while at least one of rotation speed, or presence/absence of rotating power is made different between the at least one first roller and the at least one second roller,
wherein the at least one first roller comprises a first plurality of subsidiary rollers configured to clamp the prepreg,
wherein the at least one second roller comprises a second plurality of subsidiary rollers that clamp the prepreg at a position different from a clamping position of the at least one first roller,
wherein the first plurality of subsidiary rollers comprises a cylindrical or hollow cylindrical third roller that is rotatable about a first axis and two circular disc-shaped fourth rollers that are rotatable respectively about two second axes that are inclined with respect to the first axis, and the third roller and the two fourth rollers are disposed to form a space among the third roller and the fourth rollers, the space corresponding to a cross-sectional shape of a filler to be formed from the prepreg by the composite shaping apparatus,
wherein the second plurality of subsidiary rollers comprises a cylindrical or hollow cylindrical fifth roller that is rotatable about a third axis and two circular disc-shaped sixth rollers that are rotatable respectively about two fourth axes that are inclined with respect to the third axis, and the fifth roller and the two sixth rollers are disposed to form a space among the fifth roller and the sixth rollers, the space corresponding to the cross-sectional shape of the filler to be formed from the prepreg by the composite shaping apparatus, wherein the at least one motor rotates a rotation shaft of the third roller at a first rotation speed, rotation shafts of the fourth rollers at a second rotation speed that is faster than the first rotation speed, a rotation shaft of the fifth roller at a third rotation speed that is slower than the first rotation speed, and wherein the sixth rollers are rotatable by friction force produced between the sixth rollers and the prepreg, instead of motive power transmitted from a motor to rotation shafts of the sixth rollers, and wherein the at least one first roller and the at least one second roller is configured to rotate so that a tensile force is produced in the filler between the at least one first roller and the at least one second roller.

2. The composite shaping apparatus according to claim 1, wherein the at least one motor rotates rotation shafts of the first plurality of subsidiary rollers, and wherein at least one subsidiary roller of the second plurality of subsidiary rollers is rotatable by friction force produced between the at least one subsidiary roller and the prepreg, instead of motive power transmitted from a motor to a rotation shaft of the at least one subsidiary roller.

3. The composite shaping apparatus according to claim 1, wherein first radii of the first plurality of subsidiary rollers equal to a maximum value of second radii of the second plurality of subsidiary rollers.

4. A composite shaping method comprising:
loading the prepreg with pressure with the composite shaping apparatus according to claim 1 so that a shaped prepreg is manufactured.

5. The composite shaping method according to claim 4, wherein the filler is shaped by loading a bar-shaped prepreg with pressure.

6. The composite shaping method according to claim 4, wherein condition for making at least one of the rotation speed, or the presence/absence of rotating power different between the at least one first roller and the at least one second roller is determined in accordance with at least one of material of the prepreg, temperature at which the prepreg is loaded with pressure, humidity at which the prepreg is loaded with pressure, an angle between rotation axes of the at least one first roller and the at least one second roller, or radii of a circular disc-shaped roller measured at an end of a vertical section of the circular disc-shaped roller.

* * * * *